US012777300B2

(12) United States Patent
Prospero et al.

(10) Patent No.: US 12,777,300 B2
(45) Date of Patent: Oct. 27, 2026

(54) AUDIO EFFECTIVENESS HEATMAP

(71) Applicant: SPATIALX INC., Scottsdale, AZ (US)

(72) Inventors: Xavier Prospero, Berkeley, CA (US); Aric Marshall, San Jose, CA (US); Michael Plitkins, Piedmont, CA (US); Calin Pacurariu, Cave Creek, AZ (US)

(73) Assignee: SPATIALX INC., Scottsdale, AZ (US)

( * ) Notice: Subject to any disclaimer, the term of this patent is extended or adjusted under 35 U.S.C. 154(b) by 350 days.

(21) Appl. No.: 17/893,994

(22) Filed: Aug. 23, 2022

(65) Prior Publication Data

US 2022/0408207 A1 Dec. 22, 2022

Related U.S. Application Data

(63) Continuation of application No. 17/147,335, filed on Jan. 12, 2021, now Pat. No. 11,432,090, which is a continuation of application No. 16/833,503, filed on Mar. 27, 2020, now Pat. No. 10,904,687.

(51) Int. Cl.
*H04R 29/00* (2006.01)
*H04R 5/02* (2006.01)

(52) U.S. Cl.
CPC .............. *H04R 29/008* (2013.01); *H04R 5/02* (2013.01)

(58) Field of Classification Search
CPC .......... H04R 29/008; H04R 5/02; H04R 1/26; H04R 1/345; H04R 2205/024; H04R 2205/022; H04R 3/12; H04S 2400/11; H04S 2400/01; H04S 2400/13; H04S 7/40; H04S 7/301; H04S 7/302; H04S 7/304; H04S 5/00; H04S 1/002; H04S 1/005; H04S 1/007; H04S 2420/01; H04S 3/00
USPC ........................... 381/304, 303, 300, 17, 310
See application file for complete search history.

(56) References Cited

U.S. PATENT DOCUMENTS

| | | | |
|---|---|---|---|
| 7,636,448 | B2 | 12/2009 | Metcalf |
| 9,832,584 | B2 | 11/2017 | Boehm et al. |
| 9,924,290 | B2 | 3/2018 | Babayoff et al. |
| 10,291,986 | B1 | 5/2019 | Plitkins et al. |
| 10,499,181 | B1 | 12/2019 | Ramalingam |

(Continued)

OTHER PUBLICATIONS

International Search Report and Written Opinion issued in corresponding application No. PCT/US2021/023965, dated Apr. 22, 2021.

(Continued)

*Primary Examiner* — Ahmad F. Matar
*Assistant Examiner* — Sabrina Diaz
(74) *Attorney, Agent, or Firm* — Maschoff Brennan

(57) ABSTRACT

An audio system can be configured to generate an audio heatmap for the audio emission potential profiles for one or more speakers, in specific or arbitrary locations. The audio heatmap maybe based on speaker location and orientation, speaker acoustic properties, and optionally environmental properties. The audio heatmap often shows areas of low sound density when there are few speakers, and areas of high sound density when there are a lot of speakers. An audio system may be configured to normalize audio signals for a set of speakers that cooperatively emit sound to render an audio object in a defined audio object location. The audio signals for each speaker can be normalized to ensure accurate rendering of the audio object without volume spikes or dropout.

21 Claims, 17 Drawing Sheets

(56) References Cited

U.S. PATENT DOCUMENTS

| | | | | |
|---|---|---|---|---|
| 10,904,687 | B1 | 1/2021 | Prospero et al. | |
| 2009/0097666 | A1 | 4/2009 | Kim et al. | |
| 2012/0237063 | A1 | 9/2012 | Korn | |
| 2014/0153744 | A1 | 6/2014 | Brannmark et al. | |
| 2014/0163982 | A1 | 6/2014 | Daborn et al. | |
| 2016/0073215 | A1 | 3/2016 | De Bruijn | |
| 2016/0316309 | A1 | 10/2016 | Borss et al. | |
| 2017/0070820 | A1 | 3/2017 | Behringer | |
| 2017/0070822 | A1 * | 3/2017 | Skovenborg | H04R 3/005 |
| 2017/0086008 | A1 | 3/2017 | Robinson | |
| 2019/0373394 | A1 | 12/2019 | Bernard et al. | |
| 2020/0322743 | A1 * | 10/2020 | Cengarle | H04S 3/008 |
| 2020/0404446 | A1 | 12/2020 | Filos et al. | |
| 2021/0306783 | A1 | 9/2021 | Prospero et al. | |

OTHER PUBLICATIONS

D&b Audiotechnik Gmbh, “ArrayCalc simulation software V8 ArrayProcessing feature, technical white paper,” pp. 1-8 (2015).

Scheirman, D. et al., “Large-Scale Loudspeaker Arrays: Past, Present and Future (Part Two-Electroacoustic Considerations),” 59th International Conference: Sound Reinforcement Engineering and Technology, (Jul. 2015).

Extended European Search Report dated Apr. 2, 2024 as received in Application No. 21775605.5.

* cited by examiner

AUDIO EFFECTIVENESS HEATMAP

CROSS REFERENCE TO RELATED APPLICATION

This application is a continuation of U.S. patent application Ser. No. 17/147,335, filed on Jan. 12, 2021, now U.S. Pat. No. 11,432,090, which is a continuation of U.S. patent application Ser. No. 16/833,503, filed on Mar. 27, 2020, now U.S. Pat. No. 10,904,687, which applications is incorporated herein by reference in its entirety.

FIELD

The embodiments discussed herein are related to generation of intelligent audio for physical spaces.

BACKGROUND

Many environments are augmented with audio systems. For example, hospitality locations including restaurants, sports bars, and hotels often include audio systems. Additionally locations including small to large venues, retail, temporary event locations may also include audio systems. The audio systems may play audio in the environment to create or add to an ambiance.

An audio system in the environment may suffer from deficiencies or inadequacies in some sound production for audio objects, which are audio sounds associated with a physical or virtual object (e.g., bird, mouse, etc.). In some instances, the audio object may not be effectively produced by the audio system. The deficiencies or inadequacies may arise from an inability to represent the audio object across the speaker system of the audio system. Some problems may arise due to inadequate speaker density, whether too many speakers or too few speakers in certain areas. In some instances, too many speakers can cause excessive loudness or volume peaks for the audio object, which are unfavorable or interfere with the desired ambiance. For example, a ball rolling across the floor may sound like a smooth roll until there is a volume spike that distracts from an experience with the audio object. In other instances, too few speakers can cause unevenness and sound dropouts for the audio object, which can create sound gaps that are unfavorable in many audio ambiance experiences. For example, the rolling ball may sound like a smooth roll until the sound disappears with a sound gap and then reappears in a different area, which can be unfavorable and detract from the audio ambiance experiences.

Additionally, an audio system in an environment may include irregular or inflexible speaker arrangements, in number and placement. Consequently, some audio objects may not have optimal presentation in different positions within the environment due to speaker arrangement. Alternatively, some speaker arrangements may be flexible so that they can be modified once a deficiency for an audio object is determined. There may be problems in the speaker arrangements that can cause inconsistent audio object representation for audio behaviors of the audio object. For example, the speaker arrangement may be too sparse to represent a ball rolling across the floor, such as the speakers all being too high. Due to the many different speaker arrangements of different audio systems and environment, many different versions of audio content may need to be created in order to provide a same or similar ambiance across different audio systems or different environments.

In many of the audio systems in an environment the ability to provide an audio object to a specific location in the environment may be insufficient, but the insufficiency is not known without trial and error. The problems of presenting a suitable audio object may be due to speaker densities problems. The environment may include areas with too many speakers that can cause volume spikes by a moving audio object, or dropouts when too few speakers. However, these problems may not be identified until after installation of the speakers.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to some embodiments, an audio system can include a plurality of speakers positioned in a speaker arrangement in an environment and an audio signal generator operably coupled with each speaker of the plurality of speakers. The audio signal generator, which can be embodied as a computer, is configured (e.g., includes software for causing performance of operations) to provide a specific audio signal to each speaker of a set of speakers to cause a coordinated audio emission from each speaker in the set of speakers to render an audio object in a defined audio object location in the environment. The audio signal generator is configured to process (e.g., with at least one microprocessor) audio data that is obtained from a memory device (e.g., tangible, non-transient) for each specific audio signal. The audio signal generator is configured to analyze each specific audio signal based on the audio data in view of the speaker arrangement in the environment, and then to determine the specific audio signals for each speaker in the speaker set to render the audio object in the defined audio object location. The audio signal generator includes at least one processor configured to cause performance of operations, such as the following operations described herein. The system can identify the audio object and the defined audio object location in the environment, and obtain audio data for the audio object so that the audio object can be rendered at the defined location. The system can identify the set of speakers to render the audio object at the defined audio object location, and then generate at least one specific audio signal for each speaker of the set of speakers to render the audio object at the defined audio object location. In some instance, the system can determine the at least one specific audio signal for at least one speaker in the set of speakers to be insufficient to render the audio object at the defined audio object location or set of locations (e.g., during movement of audio object). The insufficiency of the audio object may be that the volume is too low, the volume oscillates, the volume is too high, the volume spikes, the volume drops out, the rendering is intermittent, or others. Accordingly, the rendering of the audio object being insufficient is based on the at least one specific audio signal for the at least one speaker of the set of speakers causing a volume of the audio object to be insufficient, such as having a volume spike or dropout or other insufficiency. When there is an insufficiency in the rendering of the audio object, the system can normalize the at least one specific audio signal for the at least one speaker based on speaker density of the set of speakers and volume of the rendered audio object at the defined audio object location to obtain at least one normalized specific audio signal for the at least one speaker. The system can provide the at least one normalized specific audio signal to the at least one speaker, and the set of speakers can render the audio object at the defined audio object location or set of locations (e.g., movement of audio object) with a volume that is devoid of volume spikes or dropout (e.g., consistent and smoothly).

In some embodiments, an audio system can include a plurality of speakers positioned in a speaker arrangement in an environment and an audio signal generator operably coupled with each speaker of the plurality of speakers. The audio signal generator is configured to provide a specific audio signal to each speaker of a set of speakers to cause a coordinated audio emission from each speaker in the set of speakers to render an audio object in a defined audio object location in the environment based on an audio heatmap. The audio signal generator is configured to process audio data that is obtained from a memory device for each specific audio signal. The audio signal generator is configured to analyze the audio heatmap based on the audio data in view of the speaker arrangement in the environment to determine the specific audio signals for each speaker in the speaker set to render the audio object in the defined audio object location. The audio signal generator includes at least one processor configured to cause performance of operations, such as the following operations described herein. The operations can include causing the audio system to obtain speaker arrangement data defining the speaker arrangement in the environment, wherein the speaker arrangement data includes location and orientation data for each speaker. The system can obtain speaker acoustic properties of each speaker in the speaker arrangement and determine an audio emission profile for each speaker based on the speaker acoustic properties and orientation. The system can then determine the coordinated audio emission profile for at least the set of speakers, and optionally all of the speakers. Based on the foregoing, the audio system can generate and provide a report having the audio heatmap for the plurality of speakers in the speaker arrangement in the environment. In the report, the audio heatmap defines a coordinated audio emission profile for the plurality of speakers. This can include visually showing a map having the audio gradients to simulate a heatmap. The heatmap can include high density characteristics visually different from low density characteristics. The heatmap can include over-dense regions and over-sparse regions. The high density or low density characteristics can include the sound intensity, volume, oscillation, or other parameter.

In some embodiments, a method of normalizing an audio signal for rendering an audio object can be performed with an audio system, such as an embodiments of an audio system described herein. The system can include the plurality of speakers positioned in a speaker arrangement in an environment and the audio generator can be operably coupled with each speaker of the plurality of speakers. The audio signal generator is configured to provide a specific audio signal to each speaker of a set of speakers to cause a coordinated audio emission from each speaker in the set of speakers to render an audio object in a defined audio object location in the environment. The audio signal generator is configured to process audio data that is obtained from a memory device for each specific audio signal. The method can include identifying the audio object and the defined audio object location in the environment, and obtaining audio data for the audio object. The method can include identifying the set of speakers to render the audio object at the defined audio object location and generating at least one specific audio signal for each speaker of the set of speakers to render the audio object at the defined audio object location. In some instance, the method can include determining the at least one specific audio signal for at least one speaker in the set of speakers to be insufficient to render the audio object at the defined audio object location. In some aspects, the rendering of the audio object being insufficient is based on the at least one specific audio signal for the at least one speaker of the set of speakers causing a volume of the audio object to spike or dropout or otherwise inadequately render the audio object. The method can including normalizing the at least one specific audio signal for the at least one speaker based on speaker density of the set of speakers and volume of the rendered audio object at the defined audio object location to obtain at least one normalized specific audio signal for the at least one speaker and providing the at least one normalized specific audio signal to the at least one speaker. Then, the method can include rendering the audio object at the defined audio object location with a volume that is devoid of volume spikes or dropout.

In some embodiments, a method of generating an audio heatmap can be performed for an audio system. The audio heatmap can be generated for an audio system that includes a plurality of speakers positioned in a speaker arrangement in an environment and an audio signal generator operably coupled with each speaker of the plurality of speakers. The audio signal generator is configured to provide a specific audio signal to each speaker of a set of speakers to cause a coordinated audio emission from each speaker in the set of speakers to render an audio object in a defined audio object location in the environment. The audio signal generator is configured to process audio data that is obtained from a memory device for each specific audio signal. The audio heatmap can be generated based on speaker arrangement data defining the speaker arrangement in the environment, wherein the speaker arrangement includes location and orientation for each speaker. The method can include obtaining speaker acoustic properties of each speaker in the speaker arrangement and determining an audio emission profile for each speaker based on the speaker acoustic properties and orientation. The method can include determining the coordinated audio emission profile for at least the set of speakers and providing a report having the audio heatmap for the plurality of speakers in the speaker arrangement in the environment, wherein the audio heatmap defines a coordinated audio emission profile for the plurality of speakers, and each point in the heatmap represents an ability to locate a specific sound at a specific point location.

In some instances, each point on the heatmap represents the ability to locate a sound at that specific location. The accuracy of each point on the heatmap is a function of {distance from point to each speaker, closeness to each speakers axis of orientation}. To calculate an arbitrary point on the heatmap, the points location in space can be compared to the abovementioned parameters.

The objects and/or advantages of the embodiments will be realized or achieved at least by the elements, features, and combinations particularly pointed out in the claims.

It is to be understood that both the foregoing general description and the following detailed description are given as examples and explanatory and are not restrictive of the present disclosure, as claimed.

BRIEF DESCRIPTION OF THE DRAWINGS

Example embodiments will be described and explained with additional specificity and detail through the use of the accompanying drawings.

DESCRIPTION OF EMBODIMENTS

Figure 1A:
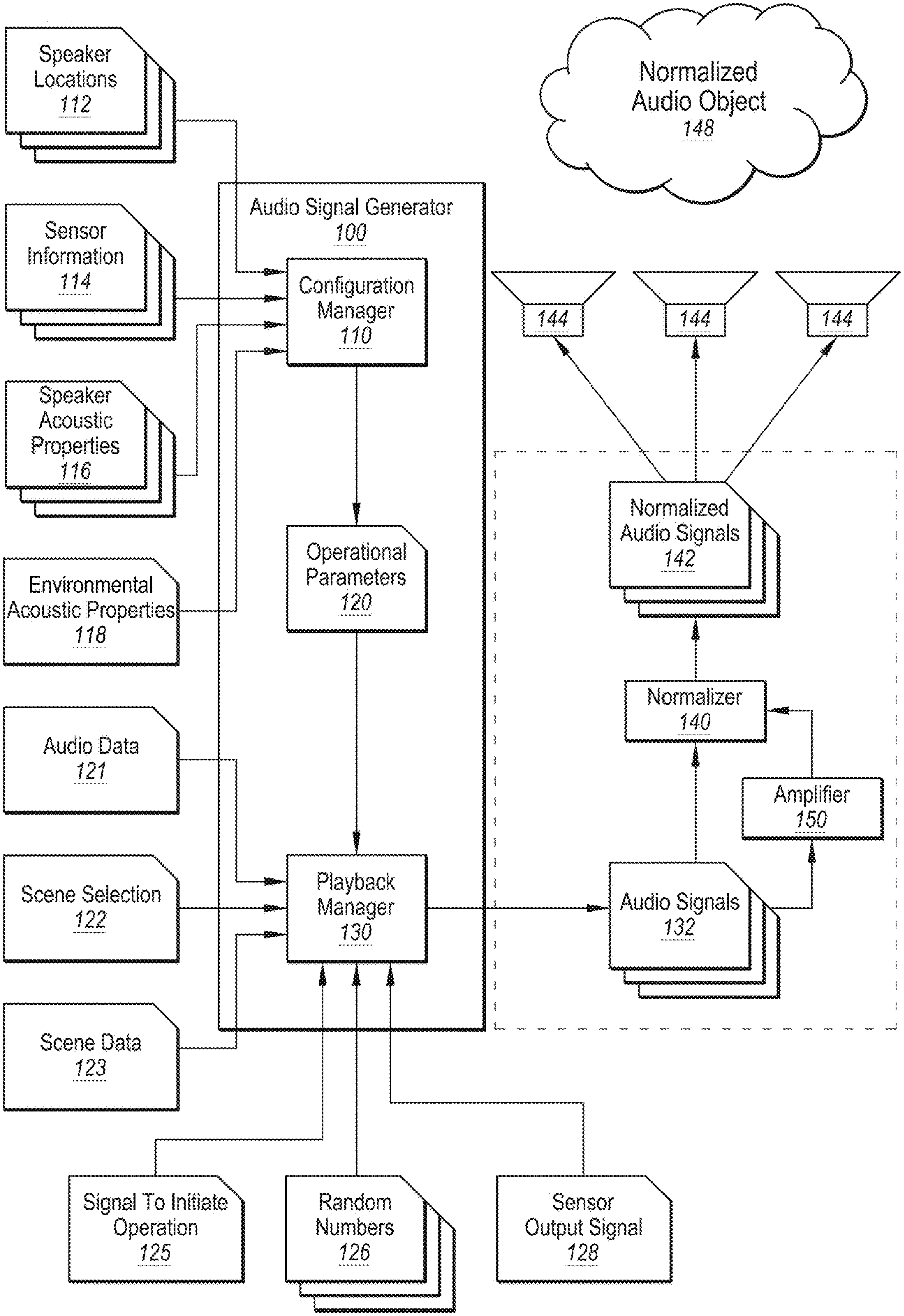
FIG. 1A is a block diagram of an example audio signal generator configured to generate audio signals for an audio system in an environment.

Conventional audio systems may have shortcomings. For example, some conventional audio systems may play the same audio at all of the speakers of the audio system. Further, while some "3D" audio systems may generate different audio signals for different speakers of the audio system, these conventional "3D" audio systems may rely on specific positioning of speakers around a listener. In another example, audio systems generally may not respond to conditions of the environment. In another example, some conventional audio systems that attempt to simulate an environment may play the same audio repeatedly such that the simulated environment may have a distinct artificial feel to it, which may annoy listeners. For example, a conventional audio system that may be configured to simulate a jungle environment for a jungle-themed restaurant may repeat a same sound track every 5 minutes. The sound track may include a bird call that repeats itself as part of the audio track every 5 minutes. A person in the environment may recognize the repetition of the bird call and be annoyed. Moreover, conventional audio systems may not be able to detect or sense environmental conditions and dynamically update the audio based on the detected environmental conditions.

Aspects of the present disclosure address these and other problems with conventional approaches by using multiple speakers to generate an audio experience. Speakers may output sound waves that are synchronized together in time, amplitude and frequencies to produce an overall volume of sound where virtual audio objects can be located and moved within a space (e.g., a virtual space). The speakers may generate different audio signals for different speakers in the environment in a dynamic manner for rendering a single audio object. In addition, the different audio signals may be generated to provide a "3D" audio experience, without relying on a specific predetermined positioning of speakers that may project the audio based on the audio signals. Further, aspects of the present disclosure may include an adjustment of the audio signals of one or more speakers based on various factors, including but not limited to: sound quality of an audio object across a plurality of speakers to produce the audio object in a defined location in the environment; speaker density having too many speakers in a region of the environment; speaker density having too few speakers in a region of the environment; regular or irregular speaker counts and placement; flexible or inflexible speaker counts and placement; consistent audio object representation for audio behaviors of the audio object; having a single version of audio content for one or more audio objects developed for a plurality of environments and audio systems; ability of audio system to represent audio object in a specific environment; or combinations thereof.

The audio system in an environment can provide an audio object in a particular location or movement trajectory/path by adjusting of the audio signals of at least one speaker in such a manner that provides volume smoothness and consistency for the audio object without the audio object volume spiking or dropping out in a particular location or region in the environment. The adjustment of the one or more audio speakers for enhanced audio object representation can be performed by a normalization procedure that normalizes the one or more audio signals (e.g., often two or more) to the corresponding one or more speakers (e.g., often two or more), which results in a more consistent and smoother sound of the audio object in a dynamic environment. A modulation of the audio signals can result in the audio system representing the audio object across multiple speakers so that the audio object is clear and consistent in quality and volume in a specific position in the environment or as the audio object moves within the environment. The modulation of the audio signals can compensate for too many speakers in certain regions of the environment or for too few speakers in certain other areas of the environment. The modulation can be configured to optimize the sound for regions that may have a sparse sound density (e.g., not enough speaker coverage) or a dense sound density (e.g., too much overlap in speaker coverage). When there is not enough coverage, the system can modulate the audio signals to determine a volume for the rendered audio object that can be achieved by the speakers. For examples, the volume emitted by one or more speakers can be cooperatively tuned so that the audio object is rendered with a volume that is smooth and consistent without spiking or dropping out. The cooperative tuning provides a specific audio signal (e.g., normalized) for each speaker so that cooperatively the volume is at the desired level and so that no speaker overcompensates and blares out high volume spiked sounds.

As used herein a sound volume "spike" is when the volume is being emitted at a certain volume, and then there is a drastic volume increase in a short time frame. For example, a chittering squirrel can be an audio object that can be heard by an observer, where the volume is fairly smooth and consistent, then suddenly within less than a second, half second, or quarter second, the volume of the chittering squirrel increases to a maximum level that is significantly higher (e.g., 1.5×, 2×, 3×, 5×, 10×, 100×, etc.), which can be maintained high or drop back down. Volume spikes often make a sound feel artificial because it does not present as the object normally sounds. Sounds may increase in volume, but not at a rapid and artificial rate that "spikes" to a much louder sound.

As used herein, a sound volume "dropout" or "drop off" is when the volume is being emitted at a certain volume, and then there is a drastic volume decrease in a short time frame. A dropout is basically the opposite of a spike. This makes if feel like an audio object disappears, which can cause an artificial ambiance experience. For example, a chittering squirrel can be an audio object that can be heard by an observer, where the volume is fairly smooth and consistent, then suddenly within less than a second, half second, or quarter second, the volume of the chittering squirrel vanishes or drops to a significantly lower (e.g., 50%, 25%, 10%, 5%, 1%, etc.), which can be maintained low or rise back up. Volume dropouts often make a sound feel artificial because it does not present as the object normally sounds, and because objects usually do not disappear. Sounds may decrease in volume, but not at a rapid and artificial rate that "drops off" to a much quieter sound or no sound at all.

The audio signals may be obtained from an audio signal generator, such as described herein. The audio signal generator can have a playback manager that can provide for the audio object to be presented whether in regular (e.g., even or homogeneous distribution) or irregular (e.g., uneven or inhomogeneous distribution) speaker counts and placements or flexible (e.g., speakers can move) or inflexible (e.g., speaker fixed or integrated) speaker placements. The playback manager can provide the audio signals to have consistent audio object representation for different audio object behaviors, such as a stationary audio object (e.g., mouse stationary), moving audio object (e.g., mouse scurrying across floor), or reactive audio object (e.g., mouse shrieks and/or moves once a person comes into a vicinity of the virtual audio object mouse).

The playback manager can receive the audio data, scene selection, and scene data that is substantially consistent (e.g., single version for use in highly variant installations or physical locations) in view of the operational parameters of the specific audio system for the specific environment. Then, the playback manager can provide the appropriate audio signals to a normalizer so that the audio signals can be modulated in accordance with the specific requirements so that the audio object can be presented with consistent audio behavior. This allows for a single version of the content to be provided and deployed across different types of audio systems with different speaker placements in order to achieve the same or similar audio object and experience from the audio object, whether stationary or dynamic. The playback manager may also perform the normalization and may be considered to be a normalizer. However, this normalization function may be distributed across various modules or a different module other than the playback manager. For example, the audio signals can be provided through one or more amplifiers that then are processed with the normalizer before being passed to the different speakers in the audio system. In any event, the audio system can normalize the audio signals so that a set of speakers can accurately render an audio object at a defined location with smooth and consistent volume.

The operational parameters provided to the playback manager can be sourced from a configuration manager. As such, a configuration manager can have information about the speaker locations and general audio profiles for the audio system and environment from the speakers. The configuration manager can either receive or store an audio heatmap that shows the density of audio potential (e.g., audio density, volume density, audio potential density, etc.), where areas in the audio heatmap nearer to one or more speakers may show increased audio density and areas further from one or more speakers can show reduced audio density. This audio heatmap can then be used to modulate the distribution of the speakers in the environment or to modulate the operational parameters provided to the playback manager, or provide modulation information to the playback manager so that the audio signals can be modulated, such as modulated by the normalization protocol. The audio heatmap can be specific to a specific installation in an environment with defined speaker placement and counts. Each specific installation can have its own audio heatmap for use in normalizing the audio signals to provide for the improved rendering of an audio object, whether stationary or dynamic.

The audio system can be configured to generate normalized audio signals in order to provide an audio experience that may change over time in a non-repetitive manner, or with the condition of the environment; which may provide for a more interactive audio experience as compared to those provided by other techniques of generating audio. The normalized audio signals can result in a better rendered audio object especially when the audio object moves and sounds to be moving through the space of the environment. The improved rendering can be obtained by the appropriate speakers receiving the normalized audio signals and emitting normalized sound for representing the audio object in discrete positions in real time in a dynamic movement.

Systems and methods related to generating dynamic audio in an environment are disclosed in the present disclosure. Generating audio in the environment may be accomplished by providing audio at a speaker in the environment based on an audio signal. Generating the audio signal may be accomplished, for example, by composing audio data into the audio signal. The audio data may include recorded or synthesized sounds. For example the audio data may include sounds of music, birds chirping, or waves crashing, or any other natural sounds of an environment (e.g., beach). A particular audio signal may include different audio data to be played simultaneously or nearly simultaneously. For example, a particular audio signal may include the sounds of birds chirping, animals moving between locations, and waves crashing, all to be played around the same time or at overlapping times. However, speaker density or audio potential distributions (e.g., see audio heatmap) may have difficulty accurately rendering such a beach scene, and speaker overcompensation can cause sound spikes or undercompensation can cause sound dropouts. The audio signals for rendering the one or more audio objects can then be normalized so that there are not any speakers with volume spikes or dropouts for a particularly rendered audio object at any specific moment in time. In real time, the audio signals can be normalized for the set of speakers to maintain the smoothness and consistency in the audio experience. The normalized audio signals result in consistency and smoothness of the resulting audio sound with reduced volume spikes or dropouts of the sounds.

In the present disclosure, providing audio at a speaker may be referred to as playing audio, audio playback, or generating audio. Also, providing audio at a speaker based on an audio signal may be referred to as playing the audio signal. Also, reference to playing the audio data of an audio signal, or playing the sound of the audio data may refer to providing audio at a speaker in which the audio is based on the audio data. The audio data or audio signal may be normalized between one or more speakers, especially across a plurality of speakers for providing audio for or rendering one or more audio objects.

Dynamic audio may include audio provided by one or more speakers that changes over time or in response to a condition of the environment. The dynamic audio may be generated by changing the composition of audio data in one or more of the audio signals by normalizing the audio signals that are received by the respective speakers so that the audio object has a smooth and consistent sound without volume spikes or dropouts. For an example of dynamic audio, an audio signal may be generated for a speaker in the environment and then normalized to optimize the sound of the audio object. The audio signal may initially include audio data of music. The composition of the audio signal may be changed to also include audio data of a bird chirping. When the speaker provides the audio from the audio signal of music, and when the audio signal changes to include the sound of the bird, the speaker may also provide the sound of the bird chirping in addition to the music such that the audio provided by the speaker may be dynamic. The normalizer can normalize each audio signal so that the respective audio object sounds smooth and consistent without volume spikes or dropouts, especially if the audio object (e.g., bird) sounds like it is in the environment with (e.g., with the music) or moving from one location to another (e.g., wings flapping while flying) in the environment.

In some embodiments, the audio system may include multiple speakers distributed throughout the environment. Each of the speakers may receive a different normalized audio signal which may result in each of the speakers providing different audio in order to accurately render the audio object at a specific location in real time. For example, in an audio system including several speakers, at least one speaker of the several speakers may play sounds of a bird chirping. The at least one speaker playing the sounds of a bird chirping may give a person in the environment the impression that a bird is chirping in a specific location, independent of speaker location. The speakers may make sound waves that are synchronized together in time, amplitude and frequencies to produce an overall volume of sound where virtual audio objects can be located and moved within a space consistently and smoothly without volume spikes or dropout. For example, sound waves may be generated such that related sound waves arrive at a predetermined location at substantially the same time, or at the same time without a volume spike or dropout. For example, audio signals may be generated and normalized such that when they are output by two speakers at two different locations, the sound generated by the speakers arrives at one or more points in the environment at or near the same time without a volume spike or dropout.

FIG. 1 is a block diagram of an example audio signal generator 100 configured to generate audio signals 132 for an audio system in an environment arranged in accordance with at least one embodiment described in this disclosure. In general, the audio signal generator 100 generates audio signals 132 for speakers 144 in an environment based on one or more of speaker locations 112, sensor information 114, speaker acoustic properties 116, environmental acoustic properties 118, audio data 121, a scene selection 122, scene data 123, a signal to initiate operation 125, random numbers 126, and sensor output signal 128. The audio signals 132 can be normalized with a normalizer 140 in order to produce normalized audio signals 142. The normalized audio signals 142 are then passed to the appropriate speakers 144 in order to provide the normalized audio object 148 at the object location consistently and smoothly without a volume spike or dropout.

The audio signal generator 100 may include code and routines configured to enable a computing system to perform one or more operations to generate audio signals 132 that are then normalized into normalized audio signals 142 with the normalizer 140. The audio signals 132 may be analog or digital. In at least some embodiments, the audio signal generator 100 may include a balanced and/or an unbalanced analog connection to an external amplifier (e.g., 150), such as in embodiments where one or more speakers 144 do not include an embedded or integrated processor. The external amplifier 150 may provide amplified audio signals to the normalizer 140. The normalizer 140 and/or amplifier 150 may be considered to be part of the audio signal generator 100 as shown by the dashed line box, but may be individual components or grouped together. Additionally or alternatively, the audio signal generator 100 may be implemented using hardware including a processor, a microprocessor (e.g., to perform or control performance of one or more operations), a field-programmable gate array (FPGA), a digital signal processor (DSP), or an application-specific integrated circuit (ASIC). In some other instances, the audio signal generator 100 may be implemented using a combination of hardware and software. In the present disclosure, operations described as being performed by the audio signal generator 100 may include operations that the audio signal generator 100 may direct a system to perform. The audio signal generator 100 may include more than one processor that can be distributed among multiple speakers or centrally located, such as in a rack mount system that may connect to a multi-channel amplifier.

In some embodiments, the audio signal generator 100 may include a configuration manager 110 which may include code and routines configured to enable a computing system to perform one or more operations to configure speakers 144 of an audio system for operation in an environment. Additionally or alternatively, the configuration manager 110 may be implemented using hardware including a processor, a microprocessor (e.g., to perform or control performance of one or more operations), an FPGA, or an ASIC. In some other instances, the configuration manager 110 may be implemented using a combination of hardware and software. In the present disclosure, operations described as being performed by the configuration manager 110 may include operations that the configuration manager 110 may direct a system to perform.

In general the configuration manager 110 may be configured to generate operational parameters 120 that may include information that may cause an adjustment in the way audio is generated and/or adjusted. In an example, the configuration manager 110 can use an audio heatmap for the speakers 144 in the installation. In another example, the normalizer 140 may be part of the configuration manager 110 or provide normalization data thereto. In these or other embodiments, the configuration manager 110 may be configured to generate the operational parameters 120 based on the speaker locations 112, the sensor information 114, the speaker acoustic properties 116, the environmental acoustic properties 118, room geometry, and other information. For example, the configuration manager 110 may sample a room to determine a location of walls, ceiling(s), and floor(s) or have the data input therein. The configuration manager 110 may also determine locations and orientations of speakers 144 that have been placed in the room or have the data input therein. Accordingly, the configuration manager 110 can generate the audio heatmap from the operational parameters 120, which is described in more detail herein, or the audio heatmap can be generated by data input therein.

The speaker locations 112 may include location information of one or more speakers 144 in an audio system. The speaker locations 112 may include relative location data, such as, for example, location information that relates the position/orientation of speakers 144 to other speakers 144, walls, or other features in the environment. Additionally or alternatively the speaker locations 112 may include location information relating the location of the speakers 144 to another point of reference, such as, for example, the earth, using, for example, latitude and longitude. The speaker locations 112 may also include orientation data of the speakers 144. The speakers 144 may be located anywhere in an environment. In at least some embodiments, the speakers 144 can be arranged in a space with the intent to create particular kinds of audio immersion. Example configurations for different audio immersion may include ceiling mounted speakers 144 to create an overhead sound experience, wall mounted speakers 144 for a wall of sound, a speaker distribution around the wall/ceiling area of a space to create a complete volume of sound. If there is a subfloor under the floor where people may walk, speakers 144 may also be mounted to or within the subfloor. The audio heatmap may be generated at least in part by the data of the speaker locations, such as the audio heatmap index having higher density sound at the speaker. The projection of sound from the speaker at the location can provide information for the audio potential of the audio system, which can then be used for generating the audio heatmap.

The sensor information 114 may include location information of one or more sensors in an audio system. The location information of the sensor information 114 may be the same as or similar to the location information of the speaker locations 112. Further, the sensor information 114 may include information regarding the type of sensors, for example the sensor information 114 may include information indicating that the sensors of the audio system include a sound sensor, and a light sensor. Additionally or alternatively the sensor information 114 may include information regarding the sensitivity, range, and/or detection capabilities of the sensors of the audio system. The sensor information 114 may also include information about an environment or room in which the audio signal generator 100 may be located. For example, the sensor information 114 may include information pertaining to wall locations, ceiling locations, floor locations, and locations of various objects within the room (such as tables, chairs, plants, etc.). In at least some embodiments, a single sensor device may be capable of sensing any or all of the sensor information 114.

The speaker acoustic properties 116 may include information about one or more speakers 144 of the audio system, such as, for example, a size, a wattage, and/or a frequency response of the speakers 144 as well as a frequency dispersion pattern therefrom. The speaker acoustic properties 116 can be used in generating the audio heatmap. As such, the location/orientation data (e.g., 112) and the speaker acoustic property data (116) can be used for determining the audio heatmap, where each speaker acoustic property 116 can be correlated with the speaker locations 112.

The environmental acoustic properties 118 may include information about sound or the way sound may propagate in the environment. The environmental acoustic properties 118 may include information about sources of sound from outside environment, such as, for example, a part of the environment that is open to the outside, or a street or a sidewalk. The environmental acoustic properties 118 may include information about sources of sound within the environment, such as, for example, a fountain, a fan, or a kitchen that frequently includes sounds of cooking. Additionally or alternatively environmental acoustic properties 118 may include information about the way sound propagates in the environment, such as, for example, information about areas of the environment including walls, tiles, carpet, marble, and/or high ceilings. The environmental acoustic properties 118 may include a map of the environment with different properties relating to different sections of the map, which map may be the audio heatmap or included in the audio heatmap. The environmental acoustic properties 118 can be used in generating the audio heatmap. For example, the environmental acoustic properties 118 may impact the sound potential of a certain region, such as by sound reflection causing a change in the sound potential. The audio heatmap may modify the sound density based on such reflection or other change to sound caused by an environment (e.g., sound absorption).

The operational parameters 120 may include factors that may affect the way audio generated by the audio system is propagated in the environment. Additionally or alternatively the operational parameters 120 may include factors that may affect the way that audio generated by the audio system is perceived by a listener in the environment. As such, in some embodiments, the operational parameters 120 may be based on or include, the speaker locations 112, the sensor information 114, the speaker acoustic properties 116, and/or the environmental acoustic properties 118.

Additionally or alternatively, the operational parameters 120 may be based on the speaker locations 112, the sensor information 114, the speaker acoustic properties 116, and/or the environmental acoustic properties 118 as well as the audio heatmap. For example, the relative positions of the speakers 144 with respect to each other as indicated by the speaker locations 112 may indicate how the individual sound waves of the audio projected by the individual speakers 144 may interact with each other and propagate in the environment. Additionally or alternatively, the speaker acoustic properties 116 and the environmental acoustic properties 118 may also indicate how the individual sound waves of the audio projected by the individual speakers 144 may interact with each other and propagate in the environment. Similarly, the sensor information 114 may indicate conditions within the environment (e.g. presence of people, objects, etc.) that may affect the way the sound waves may interact with each other and propagate throughout the environment. As such, in some embodiments, the operational parameters 120 may include the interactions of the sound waves that may be determined. In these or other embodiments, the interactions included in the operational parameters may include timing information (e.g., the amount of time it takes for sound to propagate from a speaker 144 to a location in the environment such as to another speaker in the environment), echoing or dampening information, constructive or destructive interference of sound waves, or the like. As a result, normalization may occur at the configuration manager 110 or provided to the configuration manager 110. Thereby, the heatmap may be used by the configuration manager 110 to provide the operational parameters.

Because the operational parameters 120 may include factors that affect the way audio emitted by the audio system is propagated in the environment, the audio signal generator 100 may be configured to generate and/or adjust the audio signals based on the operational parameters 120, with or without normalization. The audio signal generator 100 may be configured to adjust one or more settings related to generation or adjustment of audio; for example, one or more of a volume level, a frequency content, dynamics, a playback speed, a playback duration, and/or distance or time delay between speakers of the environment.

There may be unique operational parameters 120 for one or more speakers 144 of the audio system. In some embodiments, there may be unique operational parameters 120 for each speaker 144 of the audio system. The unique operational parameters 120 for each speaker 144 may be based on the unique location information of each of the speakers 144 represented in the speaker locations 112 and/or the unique speaker acoustic properties 116.

Because the operational parameters 120 may be based on the speaker locations 112 and acoustic properties 115, the operational parameters 120 may enable the generation and/or adjustment of audio signals 132 specifically for the positions of the speakers 144 in the environment. Because the generation and/or adjustment of audio signals 132, may be based on the position of the speakers 144, the speakers 144 may be distributed irregularly through the environment. It may be that there is no set positioning or configuration of speakers 144 required for operation of the audio system. It may be that the speakers 144 can be distributed regularly or irregularly throughout the environment. Accordingly, normalization of the audio data can provide for normalized audio data so that an audio object can be accurately represented by the speakers 144 as described herein.

Additionally or alternatively, because the operational parameters 120 may be based on the environmental acoustic properties 118, the operational parameters 120 may enable the generation and/or adjustment of audio signals 132 specifically for the environment. For example, the operational parameters 120 may indicate that a higher volume level may be better for a particular speaker near to the street in the environment. For another example, the operational parameters 120 may indicate that a quiet volume level may be better for a particular speaker 144 in an area of the environment that may cause sound to echo. For another example, a damping of a particular frequency may be better for a particular speaker 144 in a portion of the environment that would cause the particular frequency to echo.

In some embodiments, the normalizer 140 can be part of the configuration manager 110 so that the normalization is performed to normalize the operational parameters. As such, the protocols for normalizing the audio signals 132 may instead be applied to the data at the configuration manager 110 so that the operational parameters can provide data for the normalized audio. For example, the foregoing properties that allow for determination of the operational parameters 120 may also be used for normalizing so that the operational parameters 120 already include the normalized audio data. This allows for a high level normalization based on the information that is provide to the configuration manager 110. The configuration manager 110, thereby may be useful to perform the normalization procedure and may be considered to be a normalizer 140. When the configuration manager 110 is also a normalizer, the illustrated normalizer downstream from the playback manager 130 may be omitted, and thereby the audio signals 132 provided by the playback manager 130 may indeed already be normalized audio signals 142.

As an example of the way the audio signals 132 may be generated based on the operational parameters 120, the audio signal generator 100 may generate audio signals 132 simulating a fire truck with a blaring siren driving past an environment on one side of the environment. To simulate the fire truck the audio signal generator 100 may generate audio signals 132 including audio data of the siren for only speakers 144 on the one side of the environment. The audio object for the fire truck can be presented to sound like the fire truck is moving in the environment. Accordingly, the audio signals 132 of the fire truck may be normalized so that the sound presents as a familiar sound of a fire truck as is moves from one location to another, where the normalization can smoothen the sound of the siren to avoid volume spikes or dropout in different regions with different speaker densities. The operational parameters 120 may include speaker locations 112, thus, the audio signal generator 100 may use the operational parameters 120 to determine which audio signals 132 may include audio data of the siren for normalization purposes. Additionally or alternatively, the audio signal generator 100 may determine the volume of the audio signals 132 based on the operational parameters 120 such that the volume is the loudest at speakers 144 on the one side of the environment. During movement of the audio object of the fire truck, the normalized audio signals 142 provide for smooth consistent movement of the audio object without volume spikes or dropout as different speakers 144 change their emission for rendering the audio object as it moves through the audio potential zones of different speakers 144.

Further, to simulate the fire truck driving past the environment, the audio signal generator 100 may generate audio signals 132 including audio data of the siren at different speakers 144 at different times, or sequentially. The operational parameters 120 may include speaker locations 112, thus, the audio signal generator 100 may use the operational parameters 120 to determine the order in which the various audio signals 132 will include the audio data of the siren.

The normalization results in normalized audio signals that cause the speakers 144 to emit a continuous sound as the audio object moves across the environment. To simulate the speed at which the fire truck drives past the environment, audio signal generator 100 may generate audio signals 132 including audio data of the siren for certain durations of time at the various speakers 144. The operational parameters 120 may include speaker locations 112 which may include separation between speakers 144, thus, the operational parameters 120 may be used to determine the duration for which each of the various audio signals 132 will include the audio data of the siren. For example, the separation between speakers 144 may be non-uniform, so, to simulate the fire truck maintaining a constant speed, the various audio signals 132 may include the audio data of the siren for different durations of time. The normalization makes the sound of the audio object of the siren sound like it is moving without the sound volume spiking or dropping out.

To simulate the fire truck driving past the environment more smoothly, the audio signal generator 100 may generate audio signals 132 including audio data of the siren that gradually increase and/or decrease in volume over time. To simulate the fire truck driving past the environment more smoothly, the audio signal generator 100 may generate the audio signals 132 that maintain what may be perceived as a constant volume level in the environment. Normalization can further improve the audible experience of the fire truck driving past the environment by keeping the change of volume to within an allowable region. The operational parameters 120 may include the speaker acoustic properties 116 and the environmental acoustic properties 118 which may be used to determine appropriate volume levels for the various audio signals 132 to provide the effect of a constant volume. The audio heatmap may also be used for normalizing the audio signals 132 to account for accuracies in sound representation by the speakers 144. To simulate the fire truck driving past the environment more smoothly, the audio signal generator 100 may generate audio signals 132 including audio data of the siren in such a way that, although various speakers 144 may play the audio data of the siren starting at different times and for different durations, the sound based on the audio data of the siren may sound continuous to a listener in the environment.

Normalizing can inhibit any unwanted volume spikes in areas of high speaker density or dropout in areas with low speaker density. The audio heatmap can also be used to determine the course that the audio object of the fire truck sounds like it is following so that no dropout occurs in areas without sufficient speaker density. The operational parameters 120 may include the speaker locations 112 which may be used to determine how to play, adjust, clip, or truncate as well as normalize the audio data of the siren such that the sound based on the audio data of the siren may sound continuous to a listener in the environment.

In some embodiments, the audio signal generator 100 may include a playback manager 130 which may include code and routines configured to enable a computing system to perform one or more operations to generate audio signals 132 for speakers 144 in the environment based on operational parameters 120. Additionally or alternatively, the playback manager 130 may be implemented using hardware including a processor, a microprocessor (e.g., to perform or control performance of one or more operations), an FPGA, or an ASIC. In some other instances, the playback manager 130 may be implemented using a combination of hardware and software. In the present disclosure, operations described as being performed by playback manager 130 may include operations that the playback manager 130 may direct a system to perform.

In general, the playback manager 130 may generate audio signals 132 based on the operational parameters 120, the audio data 121, the scene selection 122, the scene data 123, the signal to initiate operation 125, the random numbers 126, and the sensor output signal 128.

The playback manager 130 may be configured to generate unique audio signals 132 that are unique to each of one or more speakers 144 of the audio system. As described above, the unique audio signals 132 may be based on unique operational parameters 120. The playback manager 130 may provide the normalized audio signals when prepared by the configuration manager 110. In some aspects, the playback manager 130 may also be configured as a normalizer 140, and thereby generate the normalized audio signals 142. That is, the playback manager may perform the normalization protocols so that the corresponding speakers 144 provide the sound of the normalized audio object 148 in the defined location.

As an example of the playback manager 130 generating audio signal 132 based on the unique operational parameters 120, an example audio data 121 may include a data stream including multiple channels. For example, the data stream may include four channels of recorded audio from four different microphones in a recording environment. The playback manager 130 may relate the four channels of recorded audio to speakers 144 in the environment based on the relative locations of the microphones in the recording environment, and the speaker locations 112 as represented in the unique operational parameters 120. Based on the relationship between the four channels of recorded audio and the speakers 144 in the environment the playback manager 130 may generate audio signal 132 for the speakers 144 in the environment. For example, the audio system may include six speakers. The playback manager 130 may compose the four channels of recorded audio into six audio signal 132 by including audio from one or more channels of recorded audio into each audio signal 132.

The playback manager 130 may be configured to generate the audio signals 132 based on the audio data 121. The audio data 121 may include any data capable of being translated into sound or played as sound. The audio data 121 may include digital representations of sound. The audio data 121 may include recordings of sounds or synthesized sounds. The audio data 121 may include recordings of sounds including for example birds chirping, birds flying, a tiger walking, mouse scurrying, ball rolling, water flowing, waves crashing, rain falling, wind blowing, recorded music, recorded speech, and/or recorded noise. The audio data 121 may include altered versions of recorded sounds. The audio data 121 may include synthesized sounds including for example synthesized noise, synthesized speech, or synthesized music. The audio data 121 may be stored in any suitable file format, including for example Motion Picture Experts Group Layer-3 Audio (MP3), Waveform Audio File Format (WAV), Audio Interchange File Format (AIFF), or Opus.

The playback manager 130 may include the audio data 121 in the audio signals 132. The playback manager 130 may select audio data 121 from the audio data 121 and, include the selected audio data 121 in the audio signals 132.

In some embodiments, the generation of audio signals 132 may include translating the audio data 121 from one format into the format of the audio signals 132. For example the audio data 121 may be stored in a digital format; and thus, the generation of audio signals 132 may include translating the audio data 121 into another format, such as, for example, an analog format.

In some embodiments, the generation of audio may include combining multiple different audio data 121 into a single audio signal 132. For example, the playback manager 130 may combine audio data 121 of a bird chirping with audio data 121 of ocean waves crashing to generate an audio signal 132 including sounds of ocean waves crashing and the bird chirping to be played at the same time, or overlapping.

In some embodiments, the audio data 121 may include a data stream. The data stream may include a stream of data that is capable of being played at a speaker 144 at, or about the time, the data stream is received. In some embodiments the data stream may be capable of being buffered.

The scene selection 122 may include an indication of a scene which may be selected from a list of available scenes. The scene data 123 may include information regarding the scene. The scene data 123 may include audio data, which may include audio data related to the scene. The audio data may be the same as, or similar to the audio data 121 described above. In the present disclosure, references to audio data 121 may also refer to audio data included in the scene data 123. Additionally or alternatively the scene data 123 may include categories of audio data related to the scene. Examples of scenes may include a beach scene, a jungle scene, a forest scene, an outdoor park scene, a sports scene, or a city scene, for example, Venice, Paris, or New York City. Additionally or alternatively scenes may be related to a movie, or a book, for example a STAR WARS® theme. The scene selection 122 may be an indication to the playback manager 130 of which scene data 123 to obtain for further use in generating the audio signals 132.

The audio signal generator 100 may use a network connection to fetch one or more scene data 123 to be played in a space. The scene data 123 may include a scene description and audio content. In addition, a web-based service (not illustrated in FIG. 1) may send control signals to audio signal generator 100 to change or control the scene that is being played. Additionally or alternatively, the control signals can come from applications or commands on remote computers, phones or tablets. Software running on the audio signal generator 100 can also be updated via the network connection.

The scene data 123 may further include one or more virtual environments, simulated objects, location properties, sound properties, and/or behavior profiles. Virtual environments will be described more fully with regard to FIGS. 5A-5B. Virtual environments of the scene data 123 may further include one or more simulated objects. Simulated objects will be described more fully with regard to FIGS. 5A-5B. The simulated objects of the scene data 123 may include location properties, sound properties, and behavior profiles. Location properties, sound properties, behavior profiles and audio heatmaps will be described more fully with regard to FIGS. 5C-5D.

The signal to initiate operation 125 may include a signal instructing the audio system to initiate operation or the generation of audio in the environment. The signal to initiate operation 125 may also give scene data to the audio system. The playback manager 130 may begin generating the audio signals 132 in response to receiving the signal to initiate operation 125.

The random numbers 126 may be random, or pseudo-random numbers from any suitable source. For example, the random numbers may include random, or pseudo-random numbers based on an algorithm, or measurements of physical phenomena such as, for example atmospheric noise or thermal noise. The random numbers 126 may be generated at the audio system, additionally or alternatively the random numbers 126 may be obtained from another source, such as, for example random.org.

The sensor output signal 128 may be one or more signals generated by one or more sensors of the audio system. The sensor output signal 128 may be based on the type of sensor generating the sensor output signal 128. For example, a sound sensor may generate a sensor output signal 128 relating to sound. The sensor output signal 128 may be an indication of a condition. Additionally or alternatively the sensor output signal 128 may be information relating to a condition. For example, the sensor output signal 128 may indicate that the environment is "occupied." Additionally or alternatively the sensor output signal 128 may indicate a number, or an approximate number of people in the environment.

The audio signals 132 may include one or more signals configured to provide audio when output by a speaker 144. The audio signals 132 may include analog or digital signals. The audio signals 132 may be of sufficient voltage to be output by speakers 144, additionally or alternatively the audio signals 132 may be of insufficient voltage to be output by speakers 144 without being amplified, or they may be sufficiently amplified. The audio signals 132 from the playback manager 130 may be normalized audio signals 142, when the normalizer is part of the audio signal generator 100 (e.g., configuration manager 110 or playback manager 130).

In some embodiments, the playback manager 130 may be configured to generate the audio signals 132. As described above, when the playback manager 130 generates the audio signals 132, the audio signals 132 may be based on the operational parameters 120.

As described above, the playback manager 130 may select particular audio data from the audio data 121 to include in the audio signals 132. The playback manager 130 may select the particular audio data based on the scene selection 122. For example, the particular audio data may be audio data related to the scene selection 122. For another example the particular audio data may be of the same category as the scene selection 122, or the particular audio data may be included in the scene data 123.

In some embodiments, the playback manager 130 may select the particular audio data for inclusion in the audio signals 132 based on the random numbers 126. For example, the particular audio data included in the audio signals 132 may be selected at random, which may mean based on the random numbers 126, from a subset of the audio data 121 that is related to the scene selection 122, or that is part of the scene data 123.

In some embodiments, the playback manager 130 may be configured to adjust the audio signals 132. In some embodiments the playback manager 130 may adjust the audio signals 132 by ceasing to include some audio data in the audio signals 132. In these or other embodiments the playback manager 130 may adjust the audio signals 132 by including some other audio data in the audio signals 132 that was not previously in the audio signals 132. For example, the audio signals 132 may include audio data including sounds of birds singing. Later, the playback manager 130 may cease including audio data of sounds of the birds singing in the audio signals 132 and start including sounds of birds taking flight in the audio signals 132. Changing which audio data is included in the audio signals 132 may be an example of generating dynamic audio.

In some embodiments the playback manager 130 may adjust the audio signals 132 by changing one or more settings, including a volume level, a frequency content, dynamics, a playback speed, or a playback duration of the audio data in the audio signal, which may be done with a normalization protocol. For example, the playback manager 130 may adjust the volume level of audio data 121 in the different audio signals 132 based on the normalization so as to provide the normalized audio signals 142. Additionally or alternatively the playback manager 130 may adjust settings of the audio signals 132. Adjusting the audio signals 132, or the particular audio data included in the audio signals 132 may be an example of the audio system generating dynamic audio. Additionally, the playback manager 130 may adjust the audio signals 132 based on the normalization protocol.

In some embodiments, the audio signal generator 100 may include a normalizer 140 which may include code and routines configured to enable a computing system to perform one or more operations to normalize audio signals 132 for speakers 144 in the environment based on operational parameters 120 and the audio heatmap. Additionally or alternatively, the normalizer 140 may be implemented using hardware including a processor, a microprocessor (e.g., to perform or control performance of one or more operations), an FPGA, or an ASIC. In some other instances, the normalizer 140 may be implemented using a combination of hardware and software. In the present disclosure, operations described as being performed by normalizer 140 may include operations that the normalizer 140 may direct a system to perform.

Modifications, additions, or omissions may be made to the audio signal generator 100 without departing from the scope of the present disclosure. For example, the audio signal generator 100 may include only the configuration manager 110 or only the playback manager 130 in some instances. In these or other embodiments, the audio signal generator 100 may perform more or fewer operations than those described. In addition. The different input parameters that may be used by the audio signal generator 100 may vary. In some embodiments, the normalizer 140 is part of the audio signal generator 110, such as part of the configuration manager 110 or the playback manager 130.

Figure 1B:
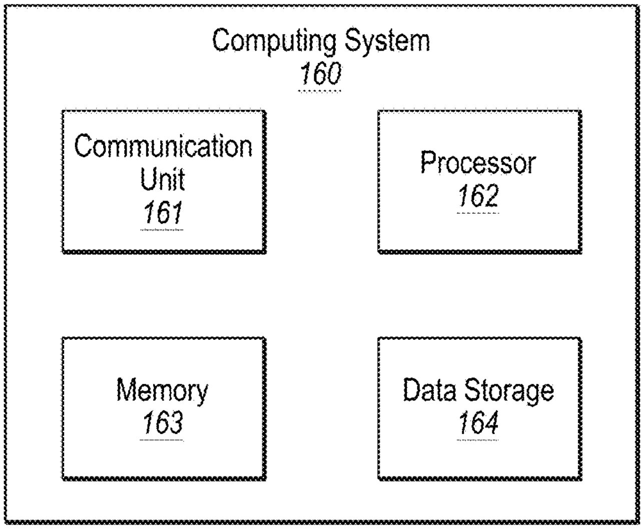
FIG. 1B is a block diagram of an example computing system that can be configured as an audio signal generator or otherwise operate an audio system.

FIG. 1B is a block diagram of an example computing system 160; which may be arranged in accordance with at least one embodiment described in this disclosure. As illustrated in FIG. 1B, the computing system 160 may include a processor 162, a memory 163, a data storage 164, and a communication unit 161.

Generally, the processor 162 may include any suitable special-purpose or general-purpose computer, computing entity, or processing device including various computer hardware or software modules and may be configured to execute instructions stored on any applicable computer-readable storage media. For example, the processor 162 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 1B, it is understood that the processor 162 may include any number of processors distributed across any number of network or physical locations that are configured to perform individually or collectively any number of operations described herein.

In some embodiments, the processor 162 may interpret and/or execute program instructions and/or process data stored in the memory 163, the data storage 164, or the memory 163 and the data storage 164. In some embodiments, the processor 162 may fetch program instructions from the data storage 164 and load the program instructions in the memory 163. After the program instructions are loaded into the memory 163, the processor 162 may execute the program instructions, such as instructions to perform one or more operations described with respect to the audio signal generator 100 of FIG. 1.

The memory 163 and the data storage 164 may include tangible, non-transient computer-readable storage media or one or more computer-readable storage mediums for carrying or having computer-executable instructions or data structures stored thereon. Such computer-readable storage media may be any available media that may be accessed by a general-purpose or special-purpose computer, such as the processor 162. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other tangible storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 162 to perform a certain operation or group of operations.

In some embodiments the communication unit 161 may be configured to obtain audio data and to provide the audio data to the data storage 164. Additionally or alternatively the communication unit 161 may be configured to obtain locations of speakers, and to provide the locations of the speakers to the data storage 164. Additionally or alternatively the communication unit 161 may be configured to obtain locations of sensors, and to provide the locations of the sensors to the data storage 164. Additionally or alternatively the communication unit 161 may be configured to obtain acoustic properties of the speakers, and to provide the acoustic properties of the speakers to the data storage 164. Additionally or alternatively the communication unit 161 may be configured to obtain acoustic properties of an environment, and to provide the acoustic properties of the environment to the data storage 164. Additionally or alternatively the communication unit 161 may be configured to obtain a selection of a scene, and to provide the selection of the scene to the data storage 164. Additionally or alternatively the communication unit 161 may be configured to obtain a signal to initiate operation, and to provide the signal to initiate operation to the data storage 164. Additionally or alternatively the communication unit 161 may be configured to obtain a random number, and to provide the random number to the data storage 164. Additionally or alternatively the communication unit 161 may be configured to obtain a sensor output signal, and to provide the sensor output signal to the data storage 164. Additionally or alternatively the communication unit 161 may be configured to obtain scene information, and to provide the scene information to the data storage 164.

Modifications, additions, or omissions may be made to the computing system 160 without departing from the scope of the present disclosure. For example, the data storage 164 may be located in multiple locations and accessed by the processor 162 through a network.

In some embodiments, the computing system described herein with the audio signal generator and the normalizer (e.g., in any of the embodiments) can be used in methods to normalize one or more audio signals for one or more speakers, and preferably normalizes a plurality of audio signals for a plurality of speakers, for generating an audible sound of an audio object in a particular location in real time. The methods can be performed with an audio system that is configured for rendering audio in a three dimensional space in an environment where the audio system includes speakers placed in precise locations around the room and the audio data being configured so that audio object are perceived to be in specific locations in real time. An established stereo system (e.g., 5.1, 6.1, 7.1 or others known or developed in the future) requires each speaker to be located in an exact spot to achieve a convincing "surround sound". The audio renderer can precompute volume for each channel because the speakers positions are well known. However, in many instances and environments is not possible to have a standard where the speakers are in exact locations in a plurality of venues because the size, shape, features, fixtures, and many other environmental aspects are inconsistent across different venues. As a result, complicated environments may require special audio system and specific speaker configurations as well as unique audio data and programming. This complicates the ability to create playback configurations for many different types of venues because each unique venue may require its own content or playback configurations, and thereby each content or playback manager is different. Accordingly, the present audio system overcomes this issue by normalizing the audio signals before the audio is emitted from the speakers. The normalization allows for a single version of the content to be deployed across highly variant venues (e.g., spaces) and speaker installations. The normalization often distributes the participation of rendering an audio object across a plurality of speakers.

The audio systems described herein are complicated and adapted to fit the venue where it is setup with the placement of the speakers often being unique. As a result, the audio systems cannot being configured simply as the 5.1 stereo system can be, and thereby require some sophisticated processing to provide suitable 3D sound for representing audio objects in specific locations in real time, such that the audio object can sound like it is at a specific location while stationary or moving. Because speakers in the present audio systems aren't placed in predefined locations (e.g., predefined locations in a movie theater), the playback manager with audio render functionality has to calculate how much gain is needed for each audio signal (e.g., each audio signal with audio data to represent the audio object) to properly represent the sound in space so that the audio object sounds like it is in a specific location or moving across a particular pathway. This becomes difficult in areas with high speaker density and low speaker density, but can be performed by normalizing the audio signals for the speakers to account for high speaker density and low speaker density. For example, if an object is near four different speakers, the gain to each speaker may be turned down to prevent an over representation of the sound; however, the amount of gain reduction for each speaker can be calculated with the normalization protocol so that the volume does not spike or dropout. On the other hand, when there are no speakers near the location the audio object should sound like it is located, the nearest speakers may need the gain of each speaker to be turned up to compensate; however, the amount of gain increase for each speaker can be calculated with the normalization protocol. If the audio object still cannot be accurately rendered by the speakers, the system may determine to cancel the audio object during a particular rendering in order to avoid volume spikes or dropout.

Figure 2:
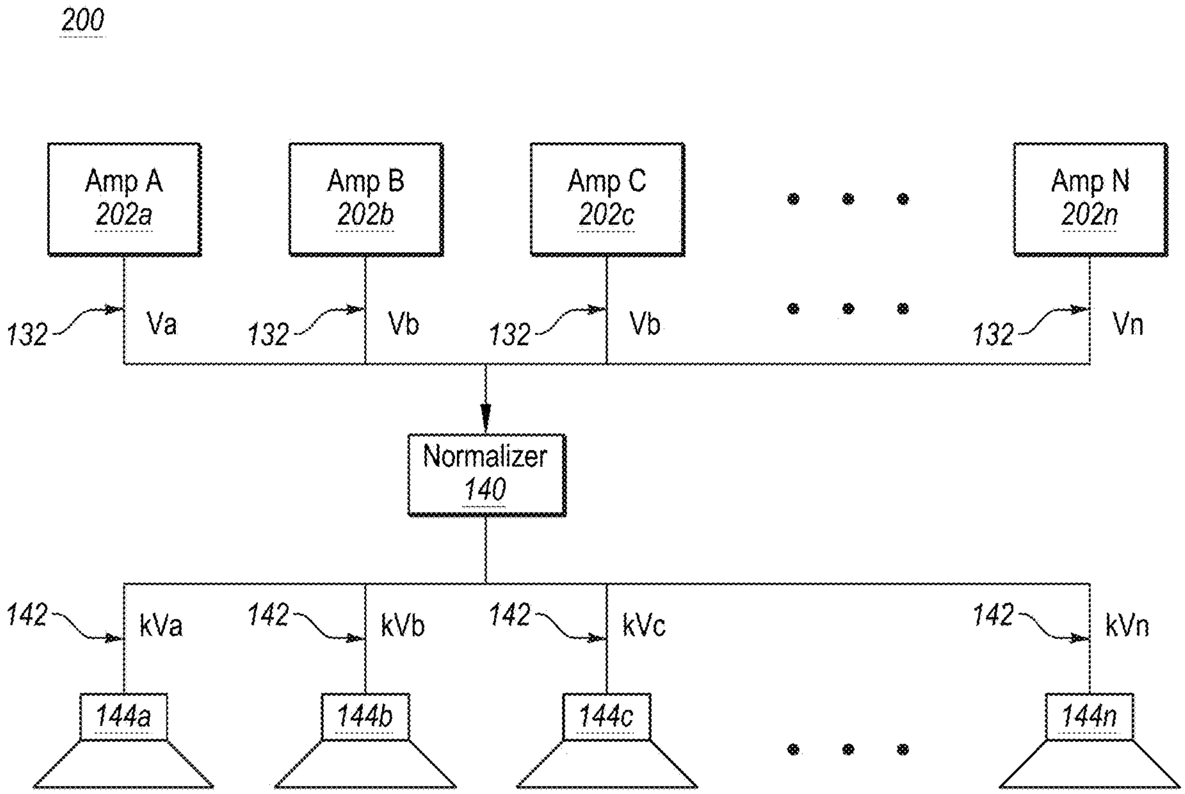
FIG. 2 is a block diagram of a portion of an audio system having a normalizer between amplifiers and speakers.

FIG. 2 illustrates an embodiment of a normalization system 200 that is configured to normalize the audio signals for one or more speakers 144*a*-144*n*. As shown, amplifier A 202*a* provides an audio signal 132 with volume Va, amplifier B 202*b* provides an audio signal 132 with volume Vb, amplifier C 202*c* provides an audio signal 132 with volume Vc, and amplifier N 202*n* provides an audio signal 132 with volume Vn. The audio signals 132 are provided to a normalizer 140, which can be a computing system 160 or part of a computing system 160 or at least have the calculation functionality of a computing system so that the audio signals 132 can be normalized into normalized audio signals 142. As a result, the normalized audio signal 142 from amplifier A 202*a* has a normalized volume of kVa for speaker A 144*a*, the normalized audio signal 142 from amplifier B 202*b* has a normalized volume of kVb for speaker B 144*b*, the normalized audio signal 142 from amplifier C 202*c* has a normalized volume of kVc for speaker C 144*c*, and the normalized audio signal 142 from amplifier N 202*n* has a normalized volume of kVn for speaker N 144*n*. Accordingly, the "k" is the normalization factor for the volume data provided to each speaker 144.

In some embodiments, the normalization protocol can use basic normalization, which provides a normalization solution to have the total intensity I of every object set to 1. The protocol can define Vi as the volume of speaker "i", and thereby it should be recognized that Va is the non-normalized volume of the audio signal 132 of speaker A 144*a* that after normalization with the normalizer 140 results in a normalization audio signal 142 of kVa for Speaker A 144*a*. The other speakers each also receive a normalized audio signal 142 that has been normalized for the specific speaker to emit the sound so that the one or more speakers provides for the normalized audio object in the defined location.

In order to a render a sound object with a set of speakers, each speaker in the room will contribute a certain amount of sound or volume to make an audio object appear as is if it is in the room. The renderer in the system (e.g., configuration manager and/or playback manager) described herein determines how loud each speaker should be to place the sound in the room. To make the calculations, the system defines the audio object (x) as being a distance ($d_i$) from a specific speaker ($s_i$). The volume (V) at the speaker $s_i$ is calculated using the following equation:

$$V_i = \frac{k}{d_i^r}. \qquad \text{Equation 1}$$

The "r" in Equation 1 is the "roll off" factor that affects how much sound is distributed throughout a room. If the roll off is small, then the volume is large or stays large even when the distance is large. If the roll off is large, then V is small and/or decreases as the distance increases. The "k" is the normalization factor that is calculated to keep the sound at consistent volumes throughout the room, which is used for normalization as described herein. To understand normalization, if k is 1 and the distance goes to zero, then the volume goes to infinity, which is unfavorable. If k is 1 and the distance goes to infinity, then the volume goes to zero. However, the normalization factor should keep objects from disappearing or getting too loud. To help the functionality of the normalization factor, the function to calculate k prevents objects from becoming too loud by limiting the total intensity of all speakers in the system to be no more than 1. The function also turns the $V_i$ of each speaker to prevent the total intensity of all speakers from being 0. The protocol can be broken down into two steps.

The first step includes calculating the volume at each speaker with k=1. Then, calculating the appropriate k so that the desired volume or behavior of the audio object is obtained. The intensity (I) is equal to the square of the volume, such as the intensity is defined as $I=(V_i)^2$ for speaker "i," exemplified by $I=(Va)^2$ for speaker A 144*a*. The following equations are used with k=1:

$$V_i' = \frac{1}{d_i^r}. \qquad \text{Equation 2}$$

$$I_{total=}\sum_{i=1}^{v} V_i^2 = f\left(\sum_{i=1}^{N} V_i'^2\right). \qquad \text{Equation 3}$$

$$f(x) = \tanh(4x-2)\frac{\alpha-\beta}{2} + \frac{\alpha+\beta}{2}. \qquad \text{Equation 4}$$

The normalization function can be chosen in such a way that the protocol can set its max and min values, and that it is both smooth and continuous. See FIGS. 3A-3C discussed in more detail below, which show the functions for various values and to provide some intuition of its behavior.

Once the above equations are obtained, the k value is isolated with the following equations:

$$I_{total} = \sum_{i=1}^{N} V_i^2 = \sum_{i=1}^{N} \frac{k^2}{d_i^{2r}} = k^2 \sum_{i=1}^{N} \frac{1}{d_i^{2r}}$$

Then, Equation 3 is used as follows:

$$k^2 \sum_{i=1}^{N} \frac{1}{d_i^{2r}} = f\left(\sum_{i=1}^{N} \frac{1}{d_i^{2r}}\right) \qquad \text{Equation 5}$$

$$k = \sqrt{\frac{f\left(\sum_{i=1}^{N} \frac{1}{(d_i^{2r})}\right)}{\sum_{i=1}^{N} \frac{1}{d_i^{2r}}}}.$$

Then, Equation 1 is used to get Equation 6:

$$V_i = \frac{1}{d_i^r} \sqrt{\frac{f\left(\sum_{i=1}^{N} \frac{1}{d_i^{2r}}\right)}{\sum_{i=1}^{N} \frac{1}{d_i^{2r}}}}. \qquad \text{Equation 6}$$

In some embodiments, basic normalization of audio signals allows for the audio system to render an audio object by sound emitted from a plurality of speakers. The location or movement of an audio object can then be compensated for when there are too many speakers that otherwise would cause excessive loudness or volume spikes, or when there are too few speakers that otherwise would cause unevenness and rapid volume dropouts. Rapid volume dropouts can be characterized to sound like the audio object suddenly ceases in mid rendering or performance. The basic normalization can still be used to calculate speaker density parameters and determine the loudness for each speaker that cooperates to render the audio object. The volume can be adjusted independently for each speaker to improve the evenness of the sound quality. For example, the speakers closest to the location of rendering an audio object can be modulated for the volume for the sound emitted for the audio object. This can be done in real time and may be based on an audio heatmap as described herein.

While this basic normalization may be useful in some instances, the setting of the intensity I to 1 results in a full volume for the audio object. As a results, the audio object always being normalized to its full volume can push the audio to the closest place in which the audio object has accurate speaker representation. For example, if the audio object is a mouse scurrying across a floor, but the audio system does not include any floor or sub-floor speakers and only has elevated speakers, then the audio object of the mouse and its sound can be snapped to the level of the nearest speaker so that the sound of the mouse appears to be from the air or above the ground and does not sound like the mouse is on the floor. Presenting the sound of a mouse audio object in midair can cause confusion and ruin an audio experience for an listener. Accordingly, some audio experiences may be properly presented with the intensity I set to 1; however, some audio experiences may be compromised with this setting. In some instances, it may be better for the intensity I to vary or be less than full volume.

Setting the intensity I to less than 1 can allow for a sound to dropout when there is not adequate speaker density or positioning. In some instances, it may sound better and provide an overall better ambiance if the sound of the mouse disappears rather than sound like it is flying through the air if the speaker placement is inadequate to represent the mouse audio object scurrying on the floor.

Modulating the intensity I and volume for the audio object at one or more speakers can provide for dynamic normalization by allowing intensity I to vary. The dynamic normalization can allow for even sparse speaker regions to provide an enhanced audio ambiance by dropping audio objects that cannot be properly represented by the speaker configuration. Rather than the mouse audio object sounding like it is flying through the air, the sound of the mouse drops out to avoid sounds that the listener would know are wrong and reduce or eliminating distracting and erroneous sounding audio objects.

Accordingly, dynamic normalization can allow for the total object intensity I to be a function of speaker density. Reference is made to the foregoing equations, such as Equation 4. The mathematical protocol for calculating α and β values can be done to determine the sound potential at a specific location for accuracy α and importance β. The default values for α and β are 1 and 0, respectively. However this configuration only has the functionality of limiting the maximum output to 1. In essence, β represents the "importance" of a sound. A high β value can signify that the sound should never be lost. An example of this would be a lead vocal in a song that needs to be present or a main character voice or animal sound in a simulation. The higher β value can cause the sound to be present even if there is inadequate speaker density. A low β value can signify that the sound is not important and can be dropped if the speaker density is too low for a proper sound. For example, a mouse scurry audio object may have a low β value so that when there are not ground or sub-floor speakers the sound can be dropped instead of inaccurately sounding like the mouse is flying. As such, the β value can be determined based on the importance of the sound being maintained versus consequence of audio ambiance if the sound is dropped.

The α then represents the "accuracy" of a rendering. That is, the (provides an indication for whether or not the sound can be well represented by the speaker distribution in the audio system. A low α means that the sound cannot be represented well by the speakers in the audio system, and the priority is not allow the volume of the speakers for the audio object to jump up and down. A high α means that the sound can be well represented by the speakers, such that the speaker density is sufficient to allow for representation of the audio object so that the volume does not jump up and down or spike or dropout.

This allows for the creation of realistic scenes in any environment with different speaker arrangements. The normalization protocol can provide for enhanced reality in a real-time experience of the sound of audio objects independent of the speaker distribution. Now, the sound of the audio object will appear to be a specific position in real time so that as the audio object moves it sounds like it is moving without volume spikes or drop-offs from one or more speakers. The normalization allows for one or more speakers (e.g., often a plurality of speakers) to be coordinated in the volume level they emit for rendering the audio object, so that together the output sounds as if the audio object is in the desired location.

Accordingly, the speakers can have coordinated output to generate the audio object in a specific location and having a playback manager, or other module, that is configured to provide the appropriate content with adjustments so that the audio object can be accurately represented by the speakers in the audio system. The normalization allows for the importance and accuracy requirements of a specific audio object, and making calculations so that the speakers work together by adjusting and reacting to the requirements to get the accurately rendered audio object. The requirements of the content for the audio object in view of the effectiveness of an audio system (e.g., see audio heatmap) can be used to create the representation of the audio object and to modify the audio signals to normalized audio signals in reaction to the known parameters (e.g., speaker density and sound potential profiles) of the audio system.

Figure 3A:
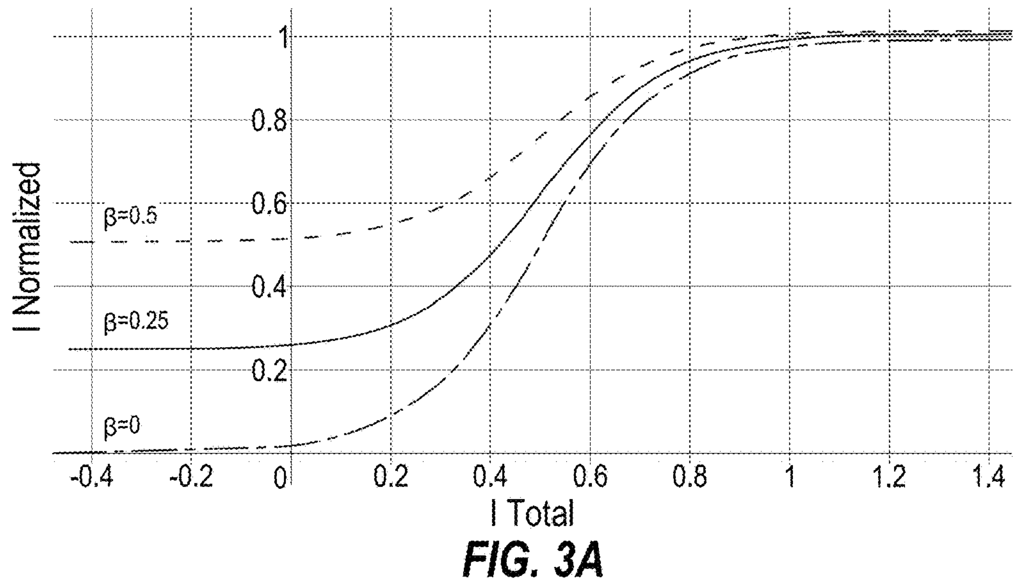
FIGS. 3A-3C show graphs related to normalization of audio signals with dynamic normalization for various α values and β values.
Figure 3B:
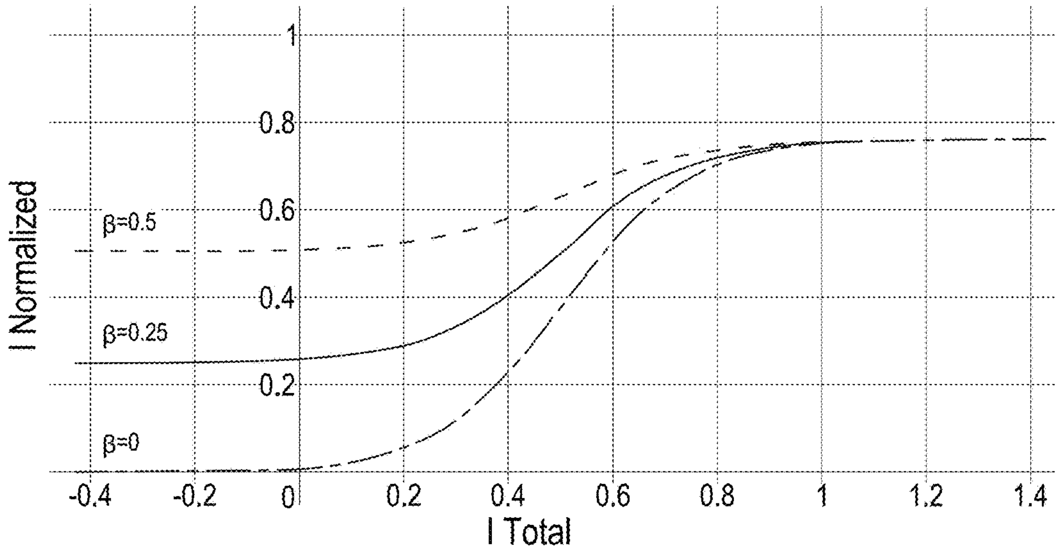
Figure 3C:
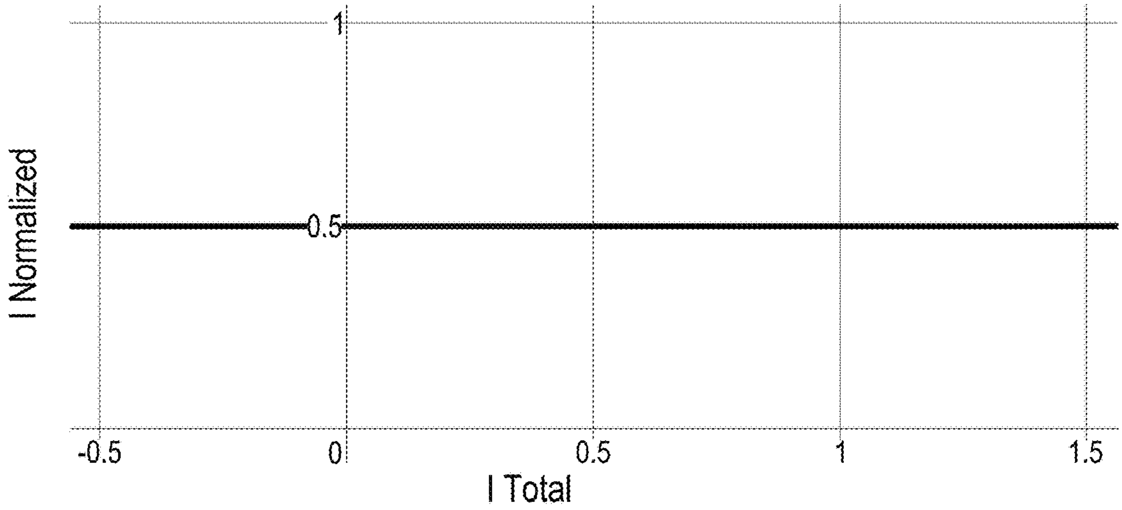

In accordance with the foregoing under Equation 4, the calculations include the graphs of FIGS. 3A-3C. FIG. 3A shows the graph when: α is 1 and β varies from 0 to 0.25 to 0.5. FIG. 3B shows the graph when α is 0.75 and β varies from 0 to 0.25 to 0.5. FIG. 3C shows the graph when α and β are both 0.5, which shows the flat line. Here, a, is greater than or equal to β, where α is a maximum and β is a minimum. Graphs for other values of a and β can also be graphed, such as α is 0.5 and β is 0, α is 1 and β is 0.49. These graphs correspond to FIGS. 3A-3C.

In an example, the β is representative of the quitest possibility of the sound. When set to zero, the sound can drop off completely. As β is increased, then the lowest possibility of the sound is increased. When β is one, then the sound never drops off. The α is representative of the maximum loudness of the sound, which at one can be full volume at 1. When α is 0.5, then the maximum is half volume. This shows the dynamic range that the sound of the audio object can have by normalization.

The dynamic normalization protocol can be used in audio systems to improve smooth rending of audio objects that have regular or irregularly placed speaker distributions. The normalized audio signals provide consistent audio for an audio object, such that the audio object sounds to have behaviors and patterns of the physical object being represented by the rendered audio object. That is, flapping wings, scurrying feet, or blowing leaves do not have patches of volume vacillation when normalized. Accordingly, now single-versions of content can be created and used in many different audio systems that have dynamic normalization. The dynamic normalization can normalize the audio signals across the speakers in real time so that instead of adjusting content for a venue, the sound emission profile of the venue is adjusted and normalized for the content. The location of rendering an audio object can be analyzed and unsuitable locations can be tagged for avoiding with the audio object. Adjustments in rendering location of an audio object can be made to provide the smooth sound to avoid problematic regions with unsuitable speaker distributions. The adjustments can prevent sound spiking or rapid dropout in view of the object placement needs of the audio object (e.g., mouse cannot fly).

The normalizer can calculate the ability of each of one or more speakers to properly render a specific audio object in a specific location. When the combination of speaker output profiles in a speaker arrangement is unable to effectively render the audio object, the normalization protocol can adjust the output of each speaker for a cooperative improvement is rendering the audio object. This can smooth out any peaks or troughs in sound quality during rendering of the audio object. As shown, the volume for each speaker can be mapped to a curve that considers the α and β values and defines maximum and minimum normalization adjustments for smooth sounding audio objects without volume spikes or rapid dropout.

Figure 4A:
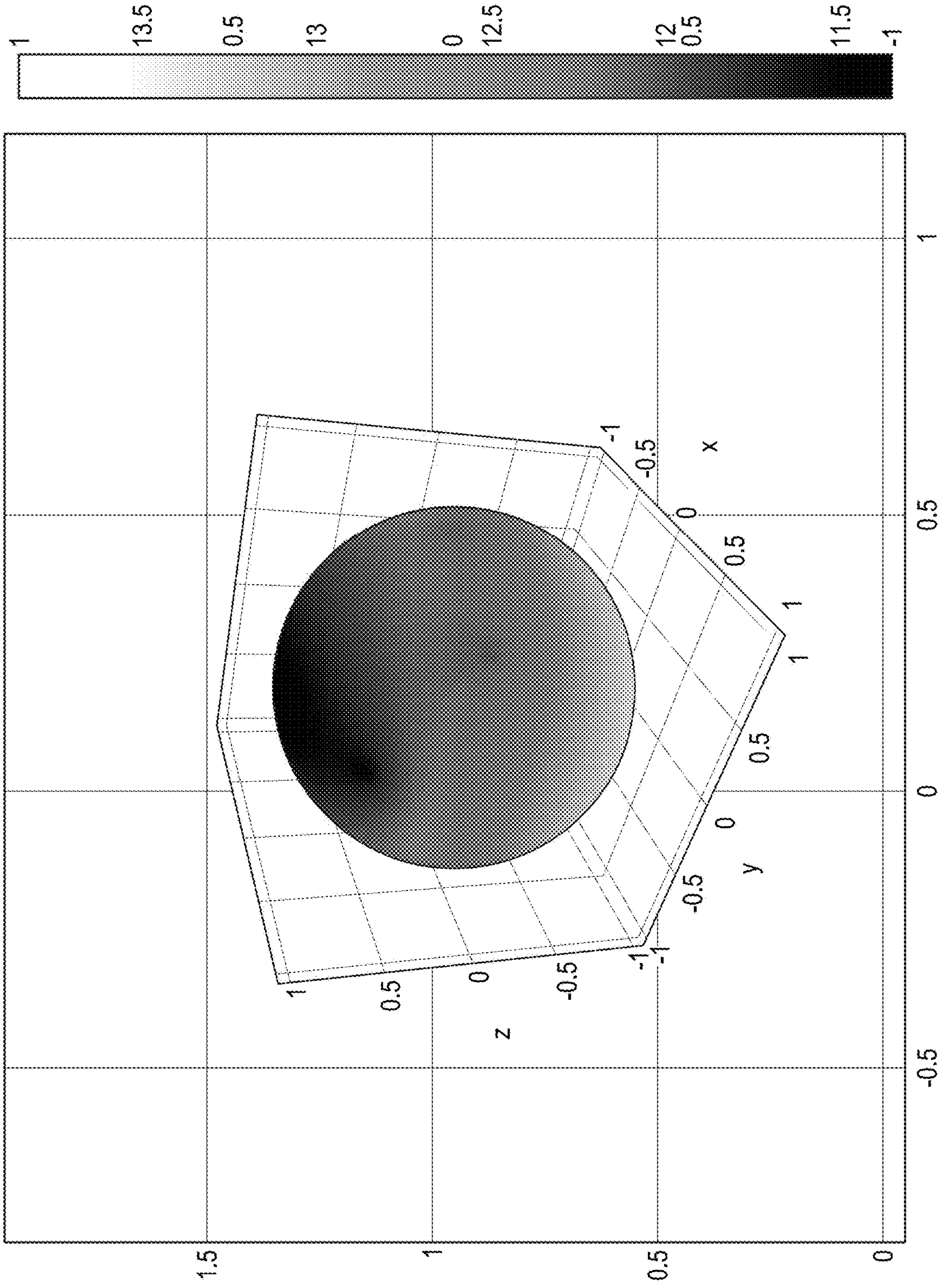
FIG. 4A is a perspective diagram of a spherical audio heatmap.
Figure 4B:
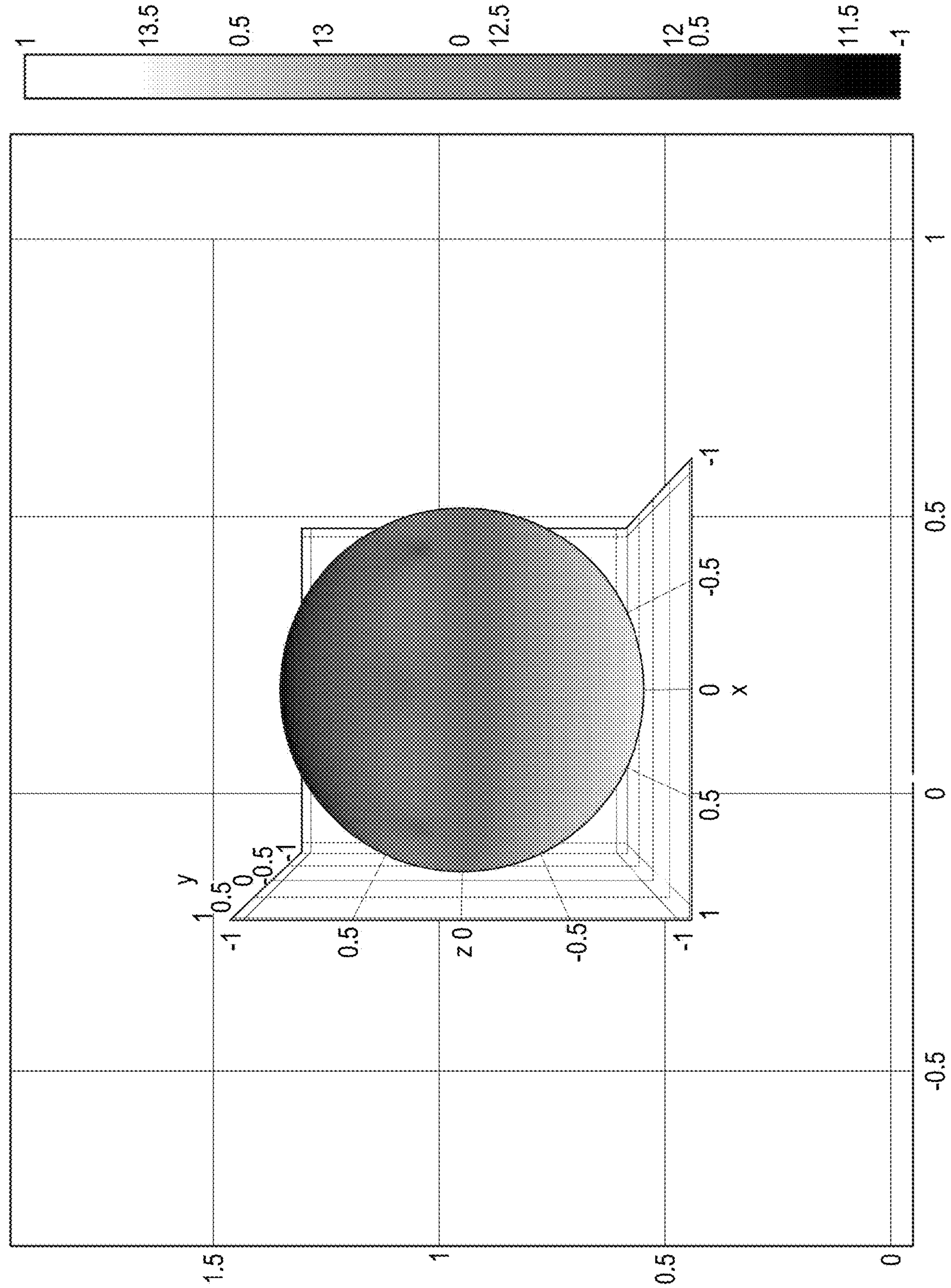
FIG. 4B is a side view diagram of a spherical audio heatmap.
Figure 4C:
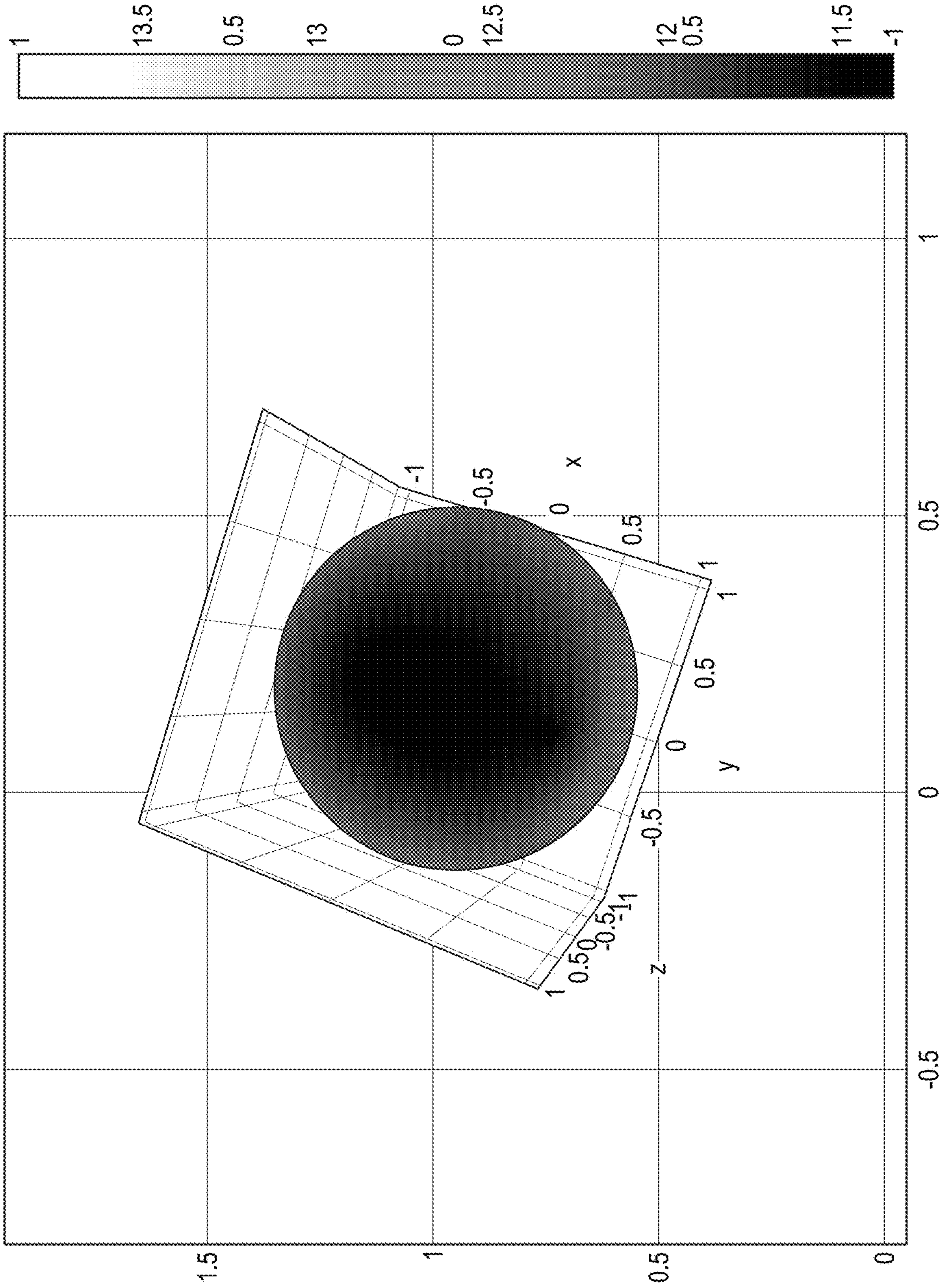
FIG. 4C is a top view diagram of a spherical audio heatmap.

FIGS. 4A-4C illustrates a generic audio heatmap, with the maximum volume potential being 1 (dark) and the minimum volume potential being −1 (light). As shown, the loud volume potentials are at the bottom, such as when speakers are on the floor or floor in in a subfloor. The quite or soundless volume potentials are at the top, such as when speakers are on the floor or floor in in a subfloor. A suspended speaker arrangement with none at ground level would be the opposite orientation that is shown in FIG. 4A. The audio heatmap may also be used, such as for calculating the α values. The heatmap can provide default α values for a speaker distribution in a venue. The audio heatmap can be analyzed to determine the average accuracy throughout the venue in view of the speaker distribution (e.g., considering position, direction, radiation pattern, or other speaker parameters). FIG. 4A is a perspective diagram of a spherical audio heatmap. FIG. 4B is a side view diagram of a spherical audio heatmap. FIG. 4C is a top view diagram of a spherical audio heatmap.

In some embodiments, the average accuracy of an object "path" can be calculated using the heatmap and used to calculate alpha and beta values. In some aspects, the method includes calculating the "path integral" of the motion path of the object over the heatmap.

Figure 4D:
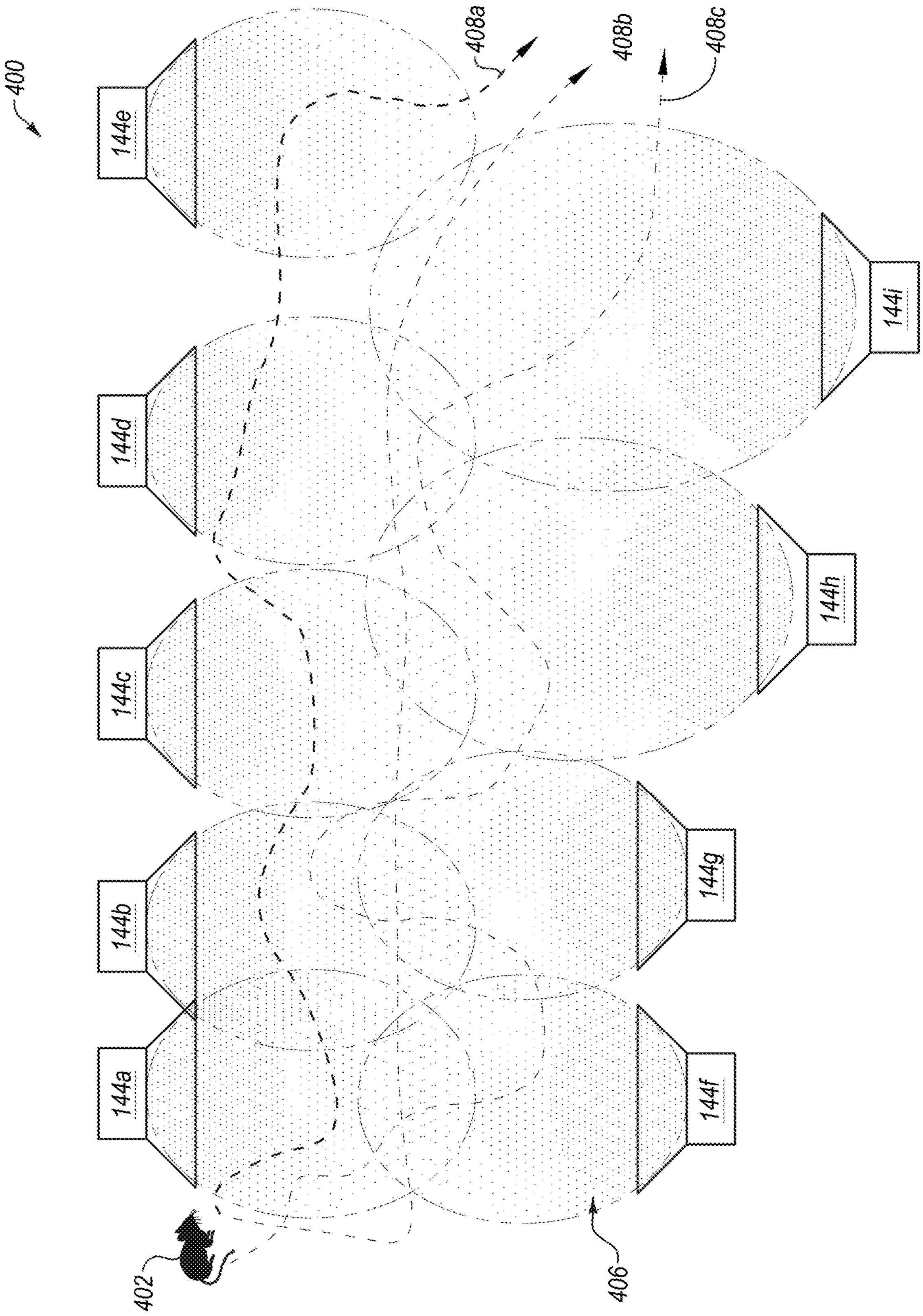
FIG. 4D is a diagram of an arrangement of speakers with the corresponding sound profiles and overall audio heatmap from the arrangement of speakers.

FIG. 4D illustrates a top view of a schematic representation of an audio heatmap 400 that shows the location of a plurality of speakers 144*a*-144*i* relative to each other. It should be recognized that the audio heatmap 400 is an idealized version for use in explaining the properties of an audio system. Each speaker 144 is shown to have a representation of the sound potential 406 that can be emitted therefrom. The speaker 144*a* is shown to have a sound potential 406 that is darker nearer to the speaker 144*a* and that lightens further away from the speaker 144*a*, which shows that the highest sound potential 404 is closer to the speaker 144*a*, and that the sound potential 406 decreases moving away from the speaker 144*a*. Thus, the sound potential 406 for each speaker 144 is darker for louder sound potential and lighter for quitter to no sound potential. The adjacent speakers, such as 144*a* and 144*b*, show a darkening where the sound potentials 406 overlap. As such, an area covered by two or more speakers 144 can provide for increased sound potential where the sound potential overlaps. Also, the regions between the sound potential 406 for adjacent speakers, such as shown between speaker 144*d* and speaker 144*e*, may be a region that no sound is possible due to possibly improper speaker placement.

Also, a mouse 402 is shown, which can be represented by an audio object presented by the speakers 144. The mouse 402 is shown to have three different travel paths 408*a*, 408*b*, and 408*c*. Path 408*a* shows that the mouse traverses regions of the sound potential that are darkened so that the speakers 114 can portray the sound, and then then across lighter regions where it is more difficult to get enough volume from the speakers 144 to accurately display the sound. Also, the path crosses regions covered by at least two speakers (e.g., 144*a*, 144*b*), which can cause both of the speakers 144*a*, 144*b* to compensate for the overlap so that the mouse scurry sounds consistent. Also, there is a gap between speaker 144*d* and speaker 144*e*, where there may be a complete drop off in the sound of the mouse scurry. The normalization can use the heatmap 400 and the content to determine whether the mouse 402 continues through the sound potential 406 of speaker 144*e* or just disappears after leaving the sound potential 406 of speaker 144*d*. In some instances, it may be better for the audio ambiance if the mouse 402 sounds like it disappears permanently after leaving the sound potential 406 of speaker 144*d*; however, in other instances having the mouse 402 sound like it reappears in the sound potential 406 of speaker 144*e* may be fine. The normalization can also use the heatmap 400 to make a sound taper (slowly from high to low) as the mouse 402 approaches the gap between 144*e* and 144*e*. Also, the normalization can also use the heatmap 400 to make a sound gradually increase (slowly from low to high) as the mouse enters into the sound potential 406 of speaker 144*e*. Path 408*b* is almost entirely in regions with very low sound potential 406, and as a result the audio system may determine that the sound of the audio object of the mouse may be too intermittent to be useful and may select path 408*b* for omission from the audio. Path 408*c* goes between regions of low sound potential 406 and regions of high sound potential, and often moves into regions covered by a few speakers 144. The heatmap 400 can be used to determine if the path 408*c* is presented or omitted, or modified. For example, the volume of path 408*c* may be set lower so that the volume is suitable for transitioning between dense and sparse sound potential regions.

The heatmap 400 can be used to calculate the α values. In some instances, there can be a default α value of a venue having an audio system with speaker placement. The arrangement of speakers 144 can provide for specific regions in the venue that have specific α values, as shown by the heatmap 400. The system can analyze the heatmap 400, which may be as provided FIG. 4D or as presented as a sphere thereof as shown in FIG. 4A, and calculate an average α value or accuracy for the entire venue. The average α value or accuracy throughout the venue can identify the volume that an audio object can have as a base α value or accuracy. Then, a proposed path, such as mouse path 408*a* is provided, the system can analyze the path 408*a* and sum all of the α values or accuracy there along, which provides a specific α value or accuracy of the sound of the audio object on that path 408*a*.

The qualities of each speaker and output thereof as well as the closeness of the speaker to a specific location that the audio object is rendered can be considered in the normalization protocol, and can be used in evaluating the potential accuracy of the audio object for one speaker or a combination of speakers. Based on the speaker properties and the placement of the rendering of the audio object, the α value or accuracy for the audio object for one speaker or for all of the speakers that may potentially render the audio object may be determined. All of the speakers with sound potential for a specific location can be analyzed to obtain the α value or accuracy that the audio object can achieve based on the distribution of the speakers and the resulting audio heat map.

In some embodiments, once the audio heatmap is defined for a specific audio system in a venue, the heatmap stays the same unless speakers are moved or reoriented. Accordingly, the system can map a plurality of movement paths for an audio object in order to determine those paths that are suitable to provide consistent audio without volume spikes, too many dropouts, or causing the audio object to have a bad placement (e.g., mouse sounding like it is flying).

For each speaker in the audio system, once the direction of influence (e.g., direction the sound is primarily aimed) is known (e.g., which can be mapped with microphones or other audio sensors or calculated based on known speaker parameters), the axis of radiation of sound is known. The axis of radiation can then be used to calculate the α value or accuracy for the audio object for a defined distance from the respective speaker, such as the distance to the axis of radiation. This a value or accuracy for the defined distance to the audio object can then be analyzed for each speaker and the proper speaker volume can be determined for each speaker so that the sum of the speaker influence provide for the continuous smooth sound without volume spikes or rapid dropout. The α value or accuracy can then be determined for a speaker pair, three speaker combination, or any number of speaker combinations that cooperate to make the audio object sound like it is present at the defined location. The specific speakers assigned to support the audio object with sound can be defined, and the volume at which they support and render the audio object can be determined so that the audio object has a specific sound quality that is consistently smooth without volume spikes or rapid dropout. The accuracy of the audio object can be determined for specific locations in the venue, where the specific locations have defined distances from the respective rendering speakers, and a path of specific locations can be mapped for the accuracy at each point. The system can then determine the volume of each rendering speaker. Thus, the general accuracy of rendering the audio object can be determined for the entire venue.

The heatmap can remain the same for a venue when the same speaker system distribution is used. Changes to the speaker system distribution can result in a change to the heatmap. As a result, deficiencies in the influence of the speaker system can be identified and rearrangement and modulation in placement, orientation, and properties of one or more speakers can be made to provide a better distribution or influence gradient. The better distribution or influence gradient can be observed by more homogenous influence in a heatmap.

The heatmap can be generated and optimized in order to maximize the ability to accurately control the sound of a rendered audio object at a specific location or along a movement path. The heatmap can be used to determine or adjust speaker placement in an environment in order to render an optimized audio object. The protocols can be performed with any speaker arrangement in an environment in order to accurately render audio objects in specific locations or on movement paths by using a heatmap, and the heatmap can provide information for the types of audio objects and locations of audio object rendering that can be performed with the defined speaker arrangement. For example, a room with no floor speakers may have difficulty in rendering a mouse audio object scurrying across the floor. The heatmap can show the appropriate coverage for audio objects for the specific speaker arrangement. The appropriate coverage can include speakers that can make sounds that render an audio object so that it sounds like the audio object is in the room at the given location. The heatmap can be generated to include a location of each speaker in the environment. The heatmap can include an axis of direction for each speaker in the environment. The heatmap can include the audio dispersion characteristics of each speaker. This information can be used for an accurate heatmap. The heatmap allows for calculation of the coverage of a certain point in the environment with the speaker arrangement, such as by determining the distance of the certain point to one or more speakers in the speaker arrangement, which may also consider the angle from the axis of direction of each speaker to the certain point, and which may also consider the dispersion cone of the one or more speakers and whether or not the certain point is within a specific dispersion cone of one or more speakers.

The calculation of a heatmap can be performed as follows. A function is defined that considers a position point in an environment, a matrix of speaker positions in the environment, and a matrix of speaker orientations (e.g., directions) and output the coverage of that position point in the environment, such as follows:

$$h(\vec{x}, S, V) = C, \text{ s.t. } c \in R. \quad \text{Equation 7}$$

S and V are matrices, where S is the matrix that represents the positions of all of the speakers in the environment and V is the matrix that represents the directions of all of the speakers in the environment. For this, speaker $S_1$ has a $V_1$ vector for direction, and speaker $S_2$ has a vector $V_2$ for direction, and position point X is a position in the environment.

$$S = \begin{bmatrix} | & | & | & \cdots & | \\ \vec{s}_1 & \vec{s}_2 & \vec{s}_3 & \ldots & \vec{s}_N \\ | & | & | & \cdots & | \end{bmatrix}. \quad \text{Equation 8}$$

$$V = \begin{bmatrix} | & | & | & \cdots & | \\ \vec{v}_1 & \vec{v}_2 & \vec{v}_3 & \ldots & \vec{v}_N \\ | & | & | & \cdots & | \end{bmatrix}. \quad \text{Equation 9}$$

$$\vec{x} = \; < x, y, z > . \quad \text{Equation 10}$$

$$\vec{s_i} = \; < x_s, y_s, z_s > . \quad \text{Equation 11}$$

$$\vec{v_i} = \; < x_v, y_v, z_v > . \quad \text{Equation 12}$$

The Equation 10 is the position in space in the environment; Equation 11 is the position of speaker i in the environment; and Equation 12 is the unit vector for the direction of the speaker i.

Equation 7 can be parsed into three parts, where each part has a higher number for better coverage.

$$h(\vec{x}, S, V) = h_1(\vec{x}, S, V) + h_2(\vec{x}, S, V) + h_3(\vec{x}, S, V). \quad \text{Equation 13}$$

The $h_1$ portion represents the x distance vector from each speaker; h2 represents how close the x distance vector is to the axis of the speaker (e.g., closer is higher number; and h3 represents the x distance vector is in the speaker dispersion pattern. The following equations are provided.

$$h_1(\vec{x}, S, V) = \sum_i \frac{1}{1 + \|\vec{x} - \vec{s}_i\|_2^2}. \quad \text{Equation 14}$$

$$h_2(\vec{x}, S, V) = \sum_i \frac{1}{\|(\vec{x} - \vec{s_i})\| - proj_{\vec{v}_i}(\vec{x} - \vec{s_i})\|}. \quad \text{Equation 15}$$

$$h_3(\vec{x}, S, V) = \sum_i -\tanh\left(\frac{2}{\theta_0}\left[\theta_0 - \cos^{-1}\left(\frac{< \vec{v_i}, (\vec{x} - \vec{s_i}) >}{\|\vec{v_i}\|\|\vec{x} - \vec{s_i}\|}\right)\right]\right). \quad \text{Equation 16}$$

In view of the foregoing, the total heatmap can be calculated as the sum of these expressions (e.g., sum of three expressions Equations 14, 15, and 16). When $h(\vec{x})$ is large, then the coverage in the area is good. A low number corresponds to poor coverage.

The heatmap can be used for optimizing speaker arrangement in an environment in order to provide better coverage and optimal audio object rendering. This can maximize the heatmap while minimizing how much each speaker is adjusted or moved. A room can include a speaker arrangement with "n" speakers, with each speaker "i" being located as point $x_i$. An audio object can be a distance $d_i$ from the speaker. Then a change of speaker location with a vector (e.g., $\vec{\Delta}_i$) can be calculated (e.g., for one or more speakers) to optimize speaker placement. The vector $\vec{\Delta}_i$ is the optimal change in speaker location that can be found with the following protocol.

The following equations are provided and can be used.

$$\underset{\Delta}{Max} \sum h_i(X + \Delta) - \|\Delta W\|_F^2. \quad \text{Equation 17}$$

Here, $$\|\Delta W\|_F^2$$

is a penalty for moving speakers.

$$x = [\vec{x_1} \; \vec{x_2} \; \ldots \; \vec{x_n}]. \quad \text{Equation 18}$$

Here, $\vec{x}_i$ is location of speaker "i".

$$\Delta = [\vec{\Delta_1} \; \vec{\Delta_2} \; \ldots \; \vec{\Delta_n}]. \quad \text{Equation 19}$$

$$\Delta = \begin{bmatrix} | & | & | & \cdots & | \\ \vec{\delta}_1 & \vec{\delta}_2 & \vec{\delta}_3 & \ldots & \vec{\delta}_N \\ | & | & | & \cdots & | \end{bmatrix}. \quad \text{Equation 19A.}$$

Here, $\vec{v}_1 + \vec{x}_1 = \vec{x}'_1$, which is a new speaker position.

$$W = \begin{bmatrix} w_1 & 0 & 0 & \ldots & 0 \\ 0 & w_2 & 0 & \ldots & 0 \\ 0 & 0 & w_3 & \ldots & 0 \\ \ldots & \ldots & \ldots & \ldots & \\ 0 & 0 & 0 & \ldots & w_N \end{bmatrix}. \quad \text{Equation 20}$$

Here, it is a weight for how much each speaker can move. The $h_i(x)$ (e.g., optionally assumed as convex) is a rolled out heatmap for speaker positioned at x. The Equation 17 covers cases when looking to adjust speaker positions.

Equation 19 or 19A can be used, which represents how much each speaker can be moved. Equation 20 weights the Matrix of Equation 19 or 19A so that each speaker can have different restrictions on how much the speaker can be moved. The $w_i$ in Equation 20 corresponds with the weight applied to $s_i$ (e.g., position of speaker i). The higher $w_i$, the less movement allowed for speaker $s_i$.

For optimization, Equation 21 can be used.

$$\max_{\Delta} \sum_{\vec{x} \in X} h_i(\vec{x}, S + \Delta, V) - \|\Delta W\|_F^2. \quad \text{Equation 21}$$

The optimization can include a protocol to find the best adjustments to maximize the heatmap. The, $$\|\Delta W\|_F^2$$

is a penalty that prevents too large of movements of the speakers. The equation can be solved using known iterative methods, such as gradient descent.

In some embodiments, the optimization of the speaker arrangement can be done by minimizing the variance of the heatmap that is generated. This minimization can make the audio coverage of the environment by the speaker system as evenly distributed as possible. However, other optimization protocols may also be used.

Figure 5A:
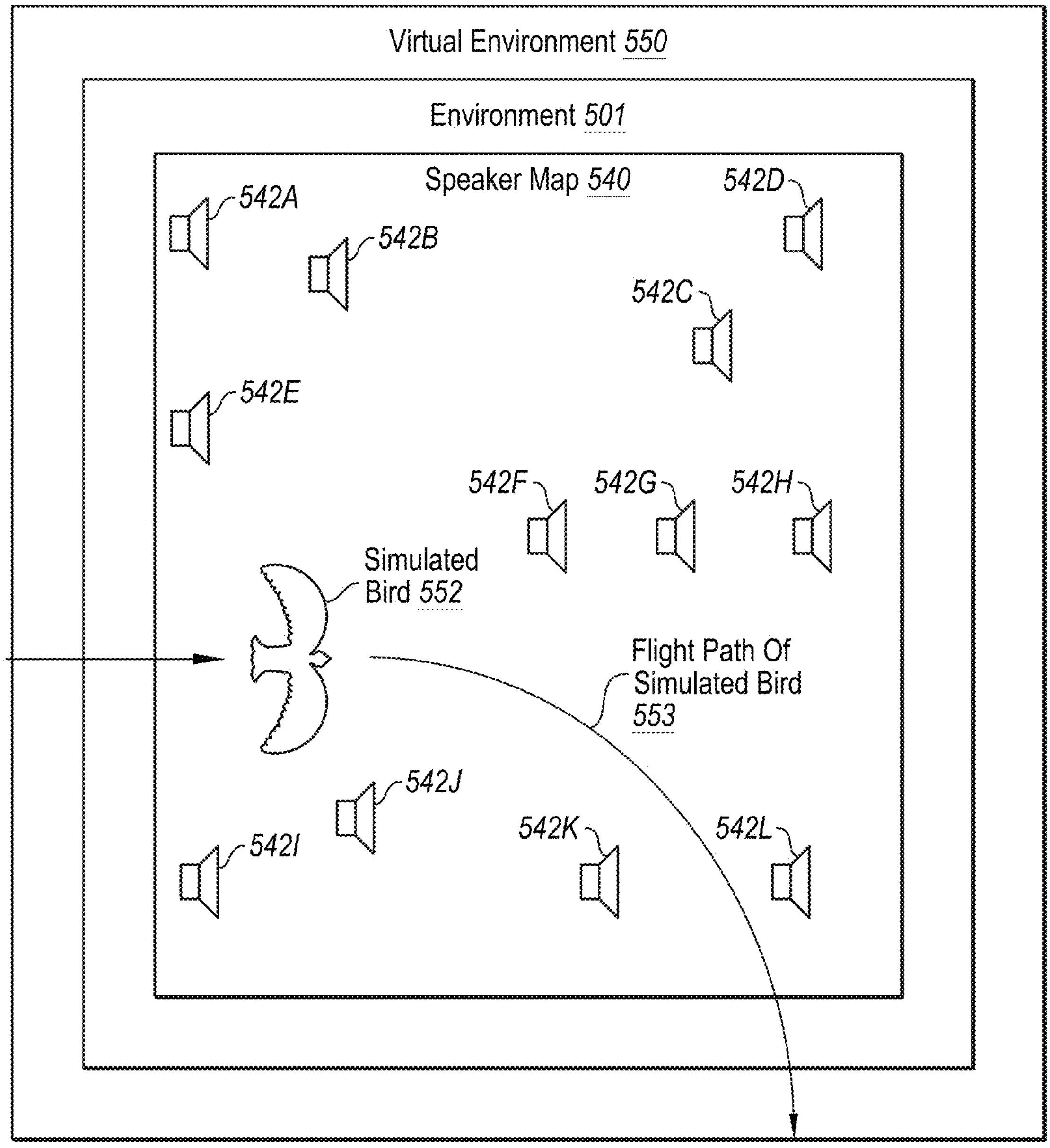
FIG. 5A is a top view of an virtual environment with a speaker map.
Figure 5B:
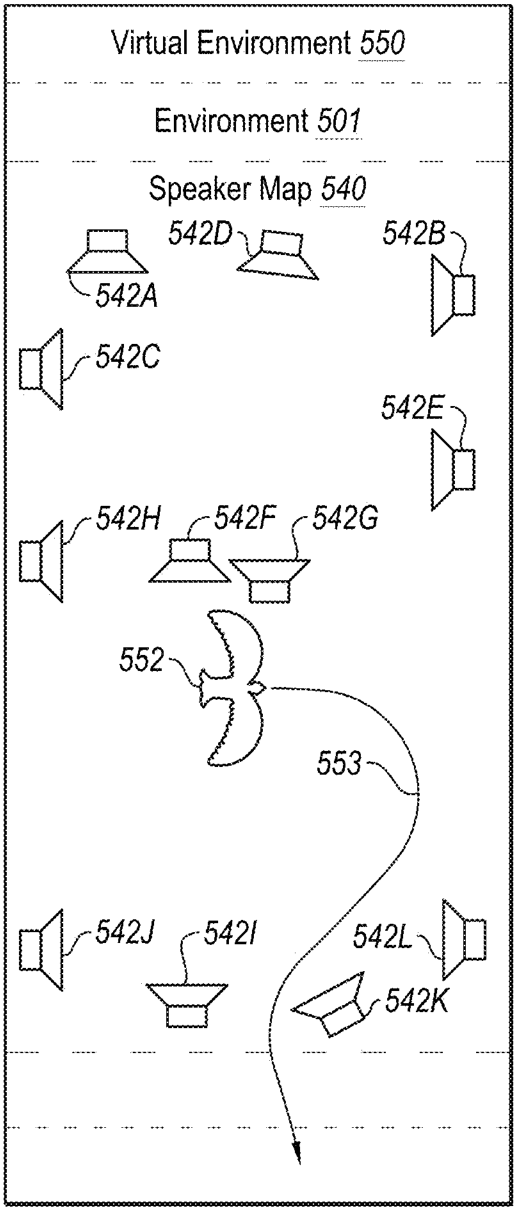
FIG. 5B is a side view of the virtual environment and speaker map of FIG. 5A.

FIGS. 5A-5B show an environment 501 associated with a virtual environment 550, and which has a speaker map 540 of a plurality of speakers 542A-542L. FIG. 5A shows a top-down view of the environment 501, and FIG. 5B shows a side view of the environment 501.

FIGS. 5A-5B together provide an illustration of an example 3D environment 501 in which an example audio system may operate overlaid with a virtual 3D environment 550 and a 3D speaker map 540 arranged in accordance with at least one embodiment described in this disclosure. FIGS. 5A-5B illustrate concepts that may be used in implementing the audio system and normalization of audio signals of this disclosure. For example, FIGS. 5A-5B illustrate one example of how the audio system might be configured to generate and/or adjust normalized audio signals for providing a consistently smooth audio object without volume spikes or rapid drop out based on the environment and the position of the speakers in the environment 501. FIGS. 5A-5B illustrate one example of how the audio system might be configured to generate unique normalized audio signals for one or more audio objects from one or more different speakers in the audio system.

In some embodiments information about the speakers 542A-542L and the environment 501 may be used when configuring the audio system for operation, when generating audio in the environment 501, and when adjusting the audio being generated. A speaker map 540 is an example of a conceptual way of organizing and representing the information that may be used in the configuration of the audio system, or in the generation and/or adjustment of normalized audio signals. The speaker map 540 may include information about the speakers 542A-542L of the audio system and information about the environment 501. In some embodiments the operational parameters may represent information about the environment 501 and the speakers 542A-542L without using the speaker map 540. In some embodiments the speaker map 540 may be included in operational parameters, which may be the same as, or similar to the operational parameters 120 of FIG. 1.

Figure 5C:
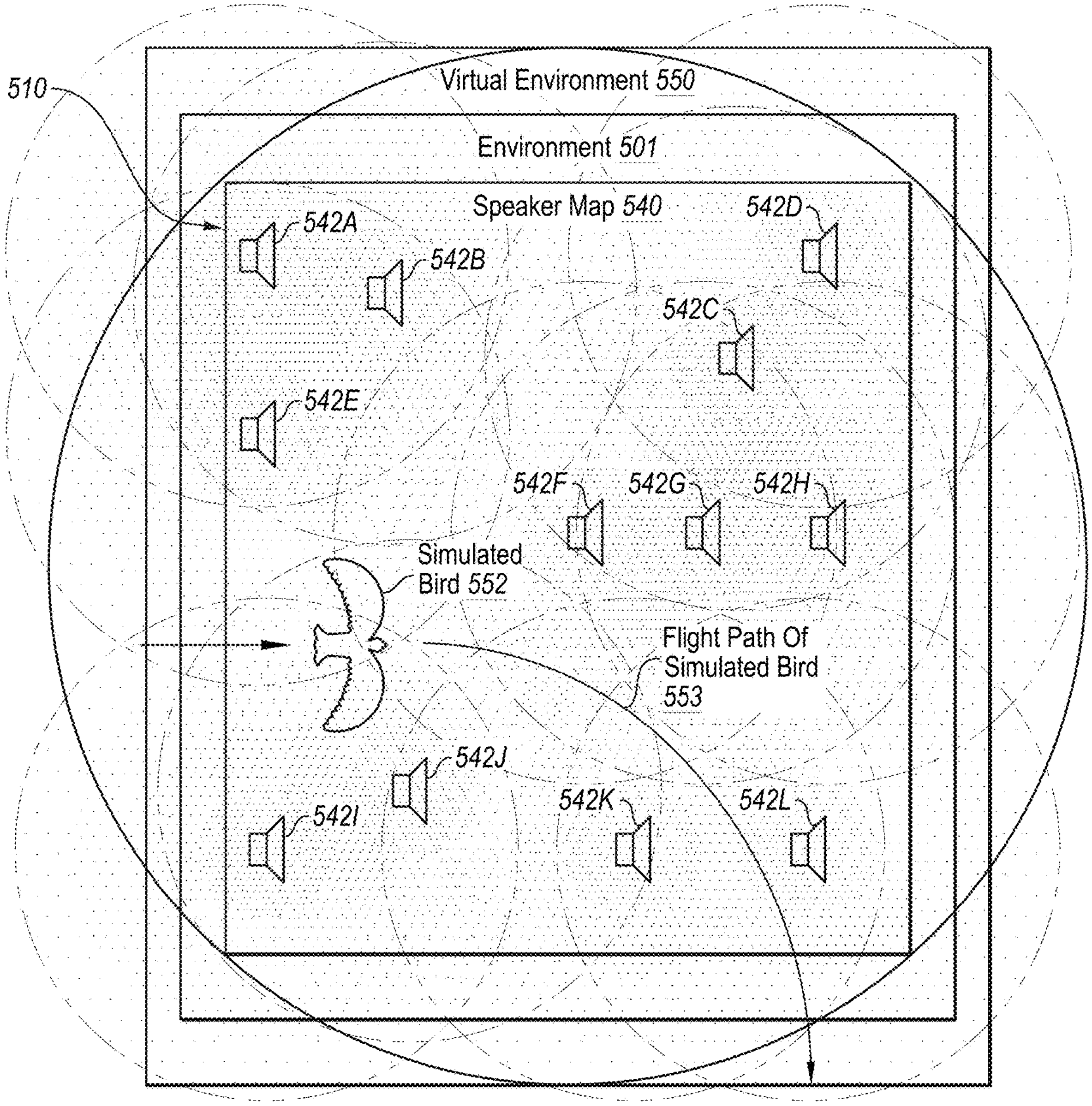
FIG. 5C is a top view of an audio heatmap for the virtual environment and speaker map of FIG. 5A.

The speaker map 540 may be generated through a space characterization process. The space characterization process may be handled using a controller, such as the controller being configured as a computing system 160 of FIG. 1B. The space characterization process may be used to determine an accurate position and/or orientation of each of the speakers in the environment 501, and then generate an audio heatmap 510 as shown in FIG. 5C (top-down view) and 5D (side view). The space characterization process may be used to determine characteristics of a space, such as locations of the ceiling, floor, and walls. The space characterization process can overly the audio heatmap 510 over the environment 501 and speaker map 540.

The space characterization process may also be used to determine audio deficiencies for each speaker resulting from placement/orientation constraints or physical aspects of the space. Example deficiencies may include speaker that may be partially obscured by an object, a speaker pointing away from the "center" of the space, a speaker positioned adjacent to a wall, a speaker placed facing a well, one or more hard surfaces causing reflections within the space, limited frequency response of a poor speaker, etc. The space characterization process may also be used to determine deficiencies in the speaker layout for the space, such as whether the speakers are placed too closely together, whether the speakers are placed too far apart, whether a desired type of sound projection with a layout may not be able to deliver (e.g., all speakers are on or near the ceiling making it difficult to achieve a 3D sound field, etc.). The space characterization process may be used to determine an overall characterization of the sound projection in the space, such as overhead sound, a wall of sound, surround sound, complete volume of sound, etc. Accordingly, the heatmap 510 can be generated by data obtained and calculated in the space characterization process.

In some embodiments, one or more speakers and one or more sensors (e.g., microphone, not shown) may be used in the space characterization process. In the present disclosure, space characterization may be referred to as obtaining acoustic properties of the environment. In some aspects, one or more speakers may generate a signal, such as, for example a ping signal, and transmit the signal into the environment. The ping signal may include electromagnetic radiation, such as, for example light or infrared light. Additionally or alternatively the ping signal may include sound, including sonic, subsonic, and/or ultrasonic frequencies. The ping signal may be transmitted into the environment. The ping signal may reflect off one or more physical objects in the environment, including for example, floors, wall, ceilings, and/or furniture. The ping signal may be received by one or more sensors. The transmitted ping signal may be compared with the reflected ping signal. The comparison may be used to generate acoustic properties of the environment. For example, a time of delay between the time of transmission and the time of reception may indicate a distance between the transmitter, which may be the speaker, a reflector, and the receiver which may be the sensor. For another example, the power of the reflected signal may indicate a degree to which the environment causes or allows sound to echo. For instance, if a speaker were to transmit a sound, and the sensor, which included a microphone were to receive the reflected sound at the same volume the acoustic property of the environment may indicate that the environment allowed echoes. Additionally or alternatively, if the microphone received multiple reflections of the reflected sound, the acoustic property of the environment may indicate that the environment allowed sounds to echo. In some embodiments the ping signal may be directed and/or scanned through the environment. In some embodiments the ping signal may include multiple ping signals at different times and/or at different frequencies. For example, a speaker may transmit a high-frequency ping signal to determine a high-frequency acoustic property of the environment; additionally or alternatively the speaker may transmit a low-frequency ping signal to determine a low-frequency acoustic property of the environment.

In some aspects, one or more speakers may generate a signal, such as, for example a frequency sweep. For example, the frequency sweep can be a sinusoid wave that is played that goes from 20 Hz to 20,000 Hz. Also, other sounds may be used.

The audio system of FIGS. 5A-5B may include a computing system (not illustrated) that may be the same as or similar to the computing system 160 of FIG. 1B. The computing system may be configured to control operations of the audio system such that the audio system may generate dynamic audio in the environment 501. The computing system may include an audio signal generator similar or analogous to the audio signal generator 100 of FIG. 1 such that the computing system may be configured to implement one or more operations related to the audio signal generator 100 of FIG. 1. In the present disclosure, the audio system generating one or more audio signals, and the speakers of the audio system providing audio based on the audio signals may be referred to as the audio system playing sound or the audio system playing audio data. In addition, reference to the audio system performing an operation may include operations that may be dictated or controlled by an audio signal generator such as the audio signal generator 100 of FIG. 1.

In some embodiments, the speaker map 540, which may include positions of one or more speakers, may be used in the configuration of the audio system and/or the generation of audio signals. For example, the speaker map 540 may include a first speaker 542A, a second speaker 542B, a third speaker 542C, a fourth speaker 542D, a fifth speaker 542E, a sixth speaker 542F, a seventh speaker 542G, an eighth speaker 542H, a ninth speaker 542I, a tenth speaker 542J, an eleventh speaker 542K, and a twelfth speaker 542L (collectively referred to as speakers 542 and/or individually as speaker 542). The speakers 542 may represent the locations of actual speakers of the audio system positioned in the environment 501. Additionally or alternatively, the speaker map 540 may include speakers 542 which may be conceptual only. However, the number of speakers may vary according to different implementations.

The speaker map 540 may include properties of the speakers 542. For example, the speaker map 540 may include the size, and/or wattage as well as sound potential (e.g., sound gradient emitted from speaker, louder closer to speaker and tapering down as moving further away from speaker) of one or more speakers in the audio system. The speaker map 540 may include smart speakers. Additionally or alternatively the speaker map 540 may include analog speakers. A single audio system may include analog, digital, and/or smart speakers. The speaker map 540 may include the placement, direction, emission axis, maximum volume, or other characteristic of a speaker as described herein or generally known.

In some embodiments the speaker map 540 may include other features of the environment 501 which may affect sound in the environment 501, for example a wall, carpet, a doorway and or a street or sidewalk near the environment 501. The speaker map 540 may include actual distances between speakers 542 in the audio system and/or other features of the environment 501. The speaker map 540 may include a two, or three dimensional map of the environment 501 including representations of the speakers of the audio system in the environment 501. The maps of FIGS. 5A-5B may be represented as any 3D map or virtual or augmented representation in 3D.

The speakers of the speaker map 540 may represent actual speakers 542 of the audio system in the environment 501. An unique audio signal for each speaker in the audio system may be generated. The generation of unique audio signals for each speaker 542 in the audio system may be based on the speaker map 540. For example, the speaker system may delay the playing of audio data for speakers in the audio system based on the distances between the speakers 542 in the speaker map 540.

Including audio data in an audio signal may be referred to as causing a speaker to play the audio data, such as for rendering the audio object. Further, because of the correspondence between speakers in the audio system, and speakers 542 in the speaker map 540, causing a speaker 542A to play audio data for an audio object may be synonymous with generating an audio signal for a speaker of the audio system that corresponds to the speaker 542A in the speaker map 540.

In some embodiments, one or more simulated objects (e.g., simulated bird 552), such as an audio object, may be used when generating audio in the environment 501, and when adjusting the audio being generated. As an example of a conceptual way of organizing and representing the simulated objects, some audio systems may use a virtual environment 550. The simulated objects may be simulated in the virtual environment 550 and may include a conceptual representation of an object that the audio system may use to generate or adjust audio in the environment 501.

The virtual environment 550 may be overlaid onto the environment 501, such that the virtual environment 550 includes space inside the environment 501. Additionally or alternatively the virtual environment 550 may extend beyond or be detached from the environment 501.

The virtual environment 550 may correspond to the speaker map 540 and/or the environment 501. Actual distance in the environment 501 may be reflected in the speaker map 540 and/or the virtual environment 550. A point in the environment 501 may be represented in the speaker map 540 and the virtual environment 550. Real objects in the environment 501 may be represented in one or both of the speaker map 540 and the virtual environment 550. For example a wall, or a street near the environment 501 may have representation in both of the virtual environment 550 and the speaker map 540.

The simulated objects (e.g., simulated bird 552) may include simulations of objects in the virtual environment 550. The simulated objects can be audio objects that may have sound properties, location properties, and a behavior profile. The sound properties may represent indicators that may relate to certain audio data, or categories of audio data. Additionally or alternatively the sound properties may represent the manner in which the simulated object may affect sounds, for example, a wall that reflects sound. The location properties of the simulated object may include a single point, or multiple points or a path of multiple points in the virtual environment 550. Additionally or alternatively the location properties of the simulated object may extend through virtual space in the virtual environment 550. The location properties of the simulated object may be constant, or the location properties of the simulated object may change over time. The behavior profile of the simulated object may govern the manner in which the simulated object behaves over time. The behavior of the simulated object may be constant, or the behavior of the simulated object may change over time, based on a random number, or in response to a condition of the environment 501.

An example of a simulated object, a particular simulated object may represent a simulated bird 552, which may represent, for example, a European swallow. The simulated bird 552 may have a single point location in the virtual environment 550 for each time unit in real time. Also, the behavior profile of the simulated bird 552 may indicate that the location of the simulated bird 552 changes over time in real time as the simulated bird 552 traverses a simulated flight path 553. Thus, the flight path of simulated bird 553 may represent a path through the virtual environment 550 to be taken by the simulated bird 552 and the rate at which the simulated bird 552 may cross the flight path of simulated bird 553. Additionally or alternatively the flight path of simulated bird 553 may represent the location of the simulated bird 552 as a function of time.

Because simulated objects may move through the virtual environment 550, which corresponds to the speaker map 540, audio data relating to simulated objects may be played at different speakers over time. For example, referring to the simulated bird 552, and the flight path of simulated bird 553, audio data of the simulated bird 552 in flight may be played at different speakers as the simulated bird 552 crosses the virtual environment 550. More than one speaker may play the audio data at the same time. Two speakers playing the audio data may play the audio data at different volumes. For example an audio data may be played at a first speaker at a volume, which may increase over time, then the audio data may be played at the first speaker at a volume that decreases over time. And, while the audio data is being played at a decreasing volume at the first speaker, the same audio data may be played at a second speaker at a volume that increases over time. This may give the impression that the simulated object is moving through the environment 501. Accordingly, normalization protocols can be performed so that the normalized audio signals allow the speakers 542 to cooperatively render the audio object with consistently smooth sound without volume peaks or rapid dropout.

For example, referring to FIGS. 5A-5B, the speakers of the audio system corresponding to the speaker 542E, the speaker 542F, the speaker 542G, the speaker 542I, the speaker 542J, the speaker 542K and the speaker 542L may be configured to play audio data of the simulated bird 552 in flight path 553. Specifically, the speakers of the audio system corresponding to the speaker 542E and the speaker 542I may be configured to play the audio data of the simulated bird 552 in flight first. Based on knowing that the airspeed velocity of an unladen European swallow may be 11 meters per second, the speakers of the audio system corresponding to the speaker 542E and the speaker 542I may be configured to play the audio data of the simulated bird 552 for only a short time. The short time may be calculated from the airspeed velocity of the simulated bird 552 and the distance between speakers in the speaker map 540. Then the speaker of the audio system corresponding to the speaker 542J may be configured to play the audio data of the simulated bird 552 in flight. Then the speaker of the audio system corresponding to the speaker 542F may be configured to play the audio data of the simulated bird 552 in flight. Then the speakers of the audio system corresponding to the speaker 542G and the speaker 542K may be configured to play the audio data of the simulated bird 552 in flight. Last, the speakers of the audio system corresponding to the speaker 542K and the speaker 542L may be configured to play the audio data of the simulated bird 552 in flight. This may give a person in the environment 501 the impression that a European swallow has flown through or over the environment 501 at 11 meters per second. The changing of the audio signals being played by the speakers as the simulated bird 552 traverses the virtual environment 550 may be an example of dynamic audio.

Additionally or alternatively the behavior profile of the simulated bird 552 may allow for multiple instances of the simulated bird 552 to traverse or be in the virtual environment 550 at any given time. The changing of the audio signals being played by the speakers as the simulated bird 552 traverses the virtual environment in changing ways or at random or pseudo-random intervals may be an example generating the audio signals based on random numbers, which may be an example of dynamic audio. The heatmap 510 of FIGS. 5C-5D can be used to identify optimal flight paths so that the rendered audio object has consistently smooth sound without volume spikes or dropout, such as by optimizing the accuracy of the audio object through the normalization protocol.

In some embodiments, the behavior profile of the simulated bird 552 may indicate that the simulated bird 552 may stop in the environment for a time. The simulated bird 552 may have sound properties including audio data related to flight and audio data related to stationary behaviors, such as, for example chirping, tweeting, or singing a birdsong. So, a behavior profile may indicate that the audio system compose audio data related to the simulated bird 552 in flight path 553 into an audio signal to be played at some speakers. Then, later, the behavior profile may indicate that the audio system compose audio data related to the simulated bird 552 at rest into an audio signal to be provided to some speakers. Then later the behavior profile may indicate that the audio system compose audio data related to the simulated bird 552 in flight into an audio signal to be played at some speakers. The changing audio signals being played by the speakers over time as a result of the behavior profile of a simulated object may be an example of dynamic audio.

Figure 5D:
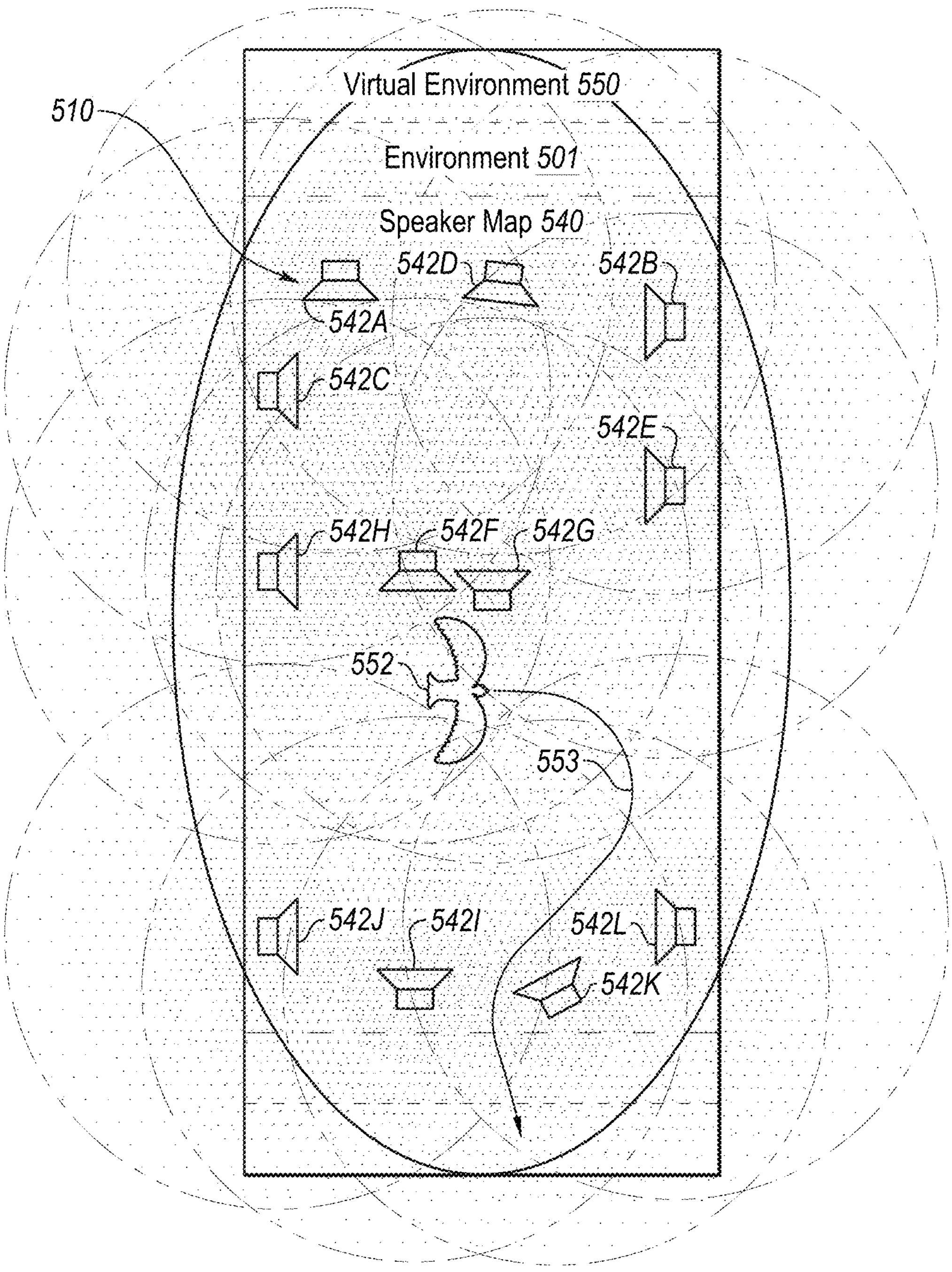
FIG. 5D is a side view of the audio heatmap corresponding to FIG. 5B.

FIG. 5C shows the view of the audio heatmap 510 for the speaker map 540 of FIG. 5A. FIG. 5D shows the view of the audio heatmap 510 for the speaker map 540 of FIG. 5B. The heatmap 510 stays the same as long as the speaker map 540 does not change. The heatmap 510 overlaid over the speaker map 540 provides the data for use in the normalization protocol.

The heatmap 510 can be used for calculating the potential a values or accuracies for each location of the audio object, and may also determine the locations with low accuracies or inaccuracies. The ability of a sound of an audio object to be rendered in each location in the environment 501 can be determined with the heatmap 510.

In instances that the heatmap 510 has one or more deficiencies in accuracy of rendering an audio object, which may be due to too many speakers in a given area (e.g., high speaker density) or too few speakers in a given area (e.g., low speaker density), the speaker arrangement and distribution can be manually changed. That is, the speakers can be relocated, repositioned, or reoriented. Then, a new audio heatmap can be generated. The heatmap 510 can be manipulated, such as with the computing system and with or without an operator (e.g., person), to smooth out to steep of sound gradients, reduce over coverage (decrease density) or reduce under coverage (increase density). The computing system can then relocate, reposition, or reorient one or more speakers 542 in the speaker map 540 so that the real speakers 542 can be repositioned in the environment 501. The new heatmap 510 can then be confirmed by manually generating the heatmap for the new speaker map 540. The position and direction of each speaker along with the speaker properties (e.g., frequency response) can be used in calculating the heatmap 510.

As shown, the heatmap 510 illustrates the ability of the speakers to accurately render the audio objects with consistently smooth sound without volume spikes and rapid dropout. Additionally, the heatmap 510 shows locations having an overly dense speaker distribution. As a result, tuning the audio system may include moving speakers further apart, removing speakers, changing direction, or otherwise decreasing speaker density. The heatmap 510 can be regenerated as often and as needed between different speaker distributions, and an iterative protocol can be performed for optimizing speaker distribution.

Similarly, the heatmap 510 shows locations having sparse speaker distribution. As a result, tuning the audio system can include moving speakers closer together, adding speakers, or changing direction, or otherwise increasing speaker density. The heatmap 510 can be regenerated as often and as needed between different speaker distributions, and an iterative protocol can be performed for optimizing speaker distribution. It should be recognized that the tuning protocol can include both some regions having speaker density decreased while other regions are having the speaker density increased. The optimization protocols described herein can be used for tuning and improving speaker density for better coverage.

The heatmap 510 can also be used to map audio content to the speaker map 540 so that the locations of rendering of audio objects can be identified and choreographed with respect to the environment 501 and with respect to each other. The normalization protocol (e.g., dynamic normalization) can be used to identify the output capability of each speaker with respect to each audio object, which is exemplified in the heatmap 510. The heatmap 510 thereby provides a visual representation of the effectiveness for the speakers in the set distribution to render audio object, and render groups of a plurality of audio objects. The heatmap 510 thereby can identify regions where an audio object may not render properly, and thereby move the audio object to a different position or along a different path so that non-rending regions can be avoided and suitable rendering regions can be utilized. For example, some non-rendering regions may be flagged to have minimal or no audio objects. In some low-rendering regions, content can be identified that can be suitably rendered by the sparse speaker density. This allows for selectively adapting audio content for regions with low rendering effectiveness. The content or playback or rendering of an audio object may be adjusted in real time for regions with low speaker density, and thereby low $\alpha$ value or low accuracy. For example, the system can query a user or installer human whether to adapt the content for the environment, or the system can make automatic adaptations (e.g., based on the heatmap).

As shown in FIGS. 4A-4D, 5C, and 5D, the heatmap may be shown as a visual representation, such as a visual representation overlaid over the speaker map. The heatmap may also be an augmented reality object overlaid over the speaker map or over any map of the environment with or without the location of the speakers being visually identified. The heatmap can use a color mapping to distinguish between high density regions and low density regions, such as the high sound density being dark and the low sound density being light, or vice versa. The color mapping may use any colors or color combinations, or may use greyscale, stipple density, or other visual indicator that can distinguish between high density regions from low density (e.g., sparse) regions. In some aspects, the high density regions can be flagged in some way with a visual marker, such as different coloring or a tag (e.g., shape such as an "X"). Similarly, low density regions can be also flagged or marked with a visual marker.

Generally, the audio systems can perform to provides scenes in a manner as described in U.S. Pat. No. 10,291,986, which is incorporated herein by specific reference. For example, the scenes may contain sound audio objects that move with behaviors defined either in a simple declarative manner, a hybrid declarative and software scripted manner, or under fully scripted control. Scenes and audio objects within the scenes may include input and output parameters that allow for a dataflow to occur in to, out of and throughout the collection of objects that make up a scene.

An audio object may include a local coordinate space with sounds at positions relative to that local coordinate space. Audio objects can be organized into hierarchies with sub-objects. Each audio object can also have an associated set of scripts that may define behaviors for the audio object. These behaviors may generate motion paths that govern how the object moves in the coordinate system, such as when to move and how to select from a potential set of sounds emitted by the object, among others.

Example adjustable audio object properties may include name, transform, position, orientation, volume, mute, priority, bounds, path, type (linear, curve, circle, scripted), velocity, mass, acceleration, points, orient, loop, delay, motion, among others.

Scripts may be expressed in various formats, such as Lua, and may be used to create behaviors more sophisticated than simply motion along a path. Scripts may also be used to handle incoming or outgoing data through the environment. Different scripts may be called at different times. In at least one embodiment, scripts may use a shared variable space. Having a shared space may allow scripts that execute at different times—and potentially for different purposes—to exchange information through the shared variables. Scripts, for example, can reference objects and the scene via a dotted namespace. Further, each speaker may include a local script engine to execute one or more scripts. Additionally or alternatively, two or more speakers may include a distributed script engine that is distributed among the two or more speakers. Whether local or distributed, the script engine(s) may control audio output within the environment.

Scenes, audio objects and audio streams may be referenced via standard Internet Uniform Resource Locators (URLs), which enables these references to be stored on a Web Server. Real time or near-real time continuous audio streams may also be referenced using URLs.

Referring back to the figures, the audio system can include a plurality of speakers positioned in a speaker arrangement in an environment and an audio signal generator operably coupled with each speaker of the plurality of speakers. The audio signal generator, which can be embodied as a computer, is configured (e.g., includes software for causing performance of operations) to provide a specific audio signal to each speaker of a set of speakers to cause a coordinated audio emission from each speaker in the set of speakers to render an audio object in a defined audio object location in the environment. The audio signal generator is configured to process (e.g., with at least one microprocessor) audio data that is obtained from a memory device (e.g., tangible, non-transient) for each specific audio signal. The audio signal generator is configured to analyze each specific audio signal based on the audio data in view of the speaker arrangement in the environment, and then to determine the specific audio signals for each speaker in the speaker set to render the audio object in the defined audio object location. The audio signal generator includes at least one processor configured to cause performance of operations, such as the following operations described herein. The system can identify the audio object and the defined audio object location in the environment, and obtain audio data for the audio object so that it can be rendered at the defined location. The system can identify the set of speakers to render the audio object at the defined audio object location, and then generate at least one specific audio signal for each speaker of the set of speakers to render the audio object at the defined audio object location. In some instance, the system can determine the at least one specific audio signal for at least one speaker in the set of speakers to be insufficient to render the audio object at the defined audio object location. The insufficiency of the audio object may be that the volume is too low, the volume oscillates, the volume is too high, the volume spikes, the volume drops out, the rendering is intermittent, or others. Accordingly, the rendering of the audio object being insufficient is based on the at least one specific audio signal for the at least one speaker of the set of speakers causing a volume of the audio object to cause the insufficiency, such as having a volume spike or dropout or other insufficiency. When there is an insufficiency in the rendering of the audio object, the system can normalize the at least one specific audio signal for the at least one speaker based on speaker density of the set of speakers and volume of the rendered audio object at the defined audio object location to obtain at least one normalized specific audio signal for the at least one speaker. The system can provide the at least one normalized specific audio signal to the at least one speaker, and the set of speakers can render the audio object at the defined audio object location with a volume that is devoid of volume spikes or dropout. The audio system can be used to perform methods of normalizing an audio signal for rendering an audio object. The methods can use the heatmap for normalizing of the audio signals or the data, in order to provide the normalized audio signal so that the audio object can be properly rendered at a defined location without volume spikes or dropout.

Figure 6A:
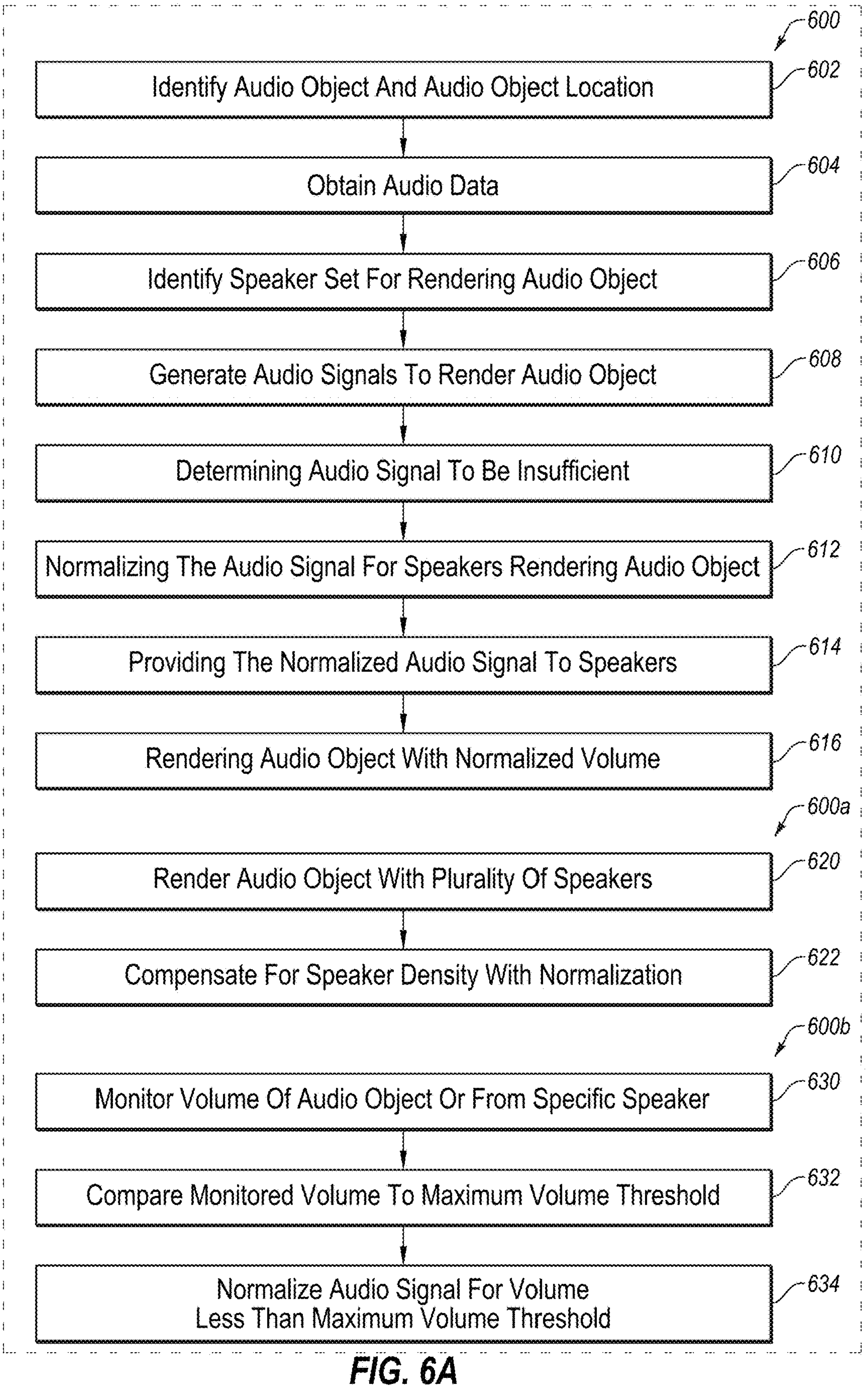
FIG. 6A is a flow diagram that illustrates a method of normalizing audio signals.

FIG. 6A shows an embodiment of a method 600 for normalizing an audio signal for rendering an audio object, which method 600 can be performed with an audio system, such as an embodiments of an audio system described herein. The system can include the plurality of speakers positioned in a speaker arrangement in an environment and the audio generator operably coupled with each speaker of the plurality of speakers. The audio signal generator is configured to provide a specific audio signal to each speaker of a set of speakers to cause a coordinated audio emission from each speaker in the set of speakers to render an audio object in a defined audio object location in the environment. The audio signal generator is configured to process audio data that is obtained from a memory device for each specific audio signal. The method 600 can include identifying the audio object and the defined audio object location in the environment at block 602, and obtaining audio data for the audio object at block 604. The method 600 can include identifying the set of speakers to render the audio object at the defined audio object location at block 606, and generating at least one specific audio signal for each speaker of the set of speakers to render the audio object at the defined audio object location at block 608. In some instances, the method 600 can include determining the at least one specific audio signal for at least one speaker in the set of speakers to be insufficient to render the audio object at the defined audio object location at block 610. In some aspects, the rendering of the audio object being insufficient is based on the at least one specific audio signal for the at least one speaker of the set of speakers causing a volume of the audio object to spike or dropout or otherwise inadequately render the audio object. The method 600 can including normalizing the at least one specific audio signal for the at least one speaker based on speaker density of the set of speakers and volume of the rendered audio object at the defined audio object location to obtain at least one normalized specific audio signal for the at least one speaker at block 612 and providing the at least one normalized specific audio signal to the at least one speaker at block 614. Then, the method 600 can include rendering the audio object at the defined audio object location with a volume that is devoid of volume spikes or dropout at block 616.

In some embodiments, a method 600*a* can include rendering the audio object at the defined audio object location with a plurality of speakers of the set of speakers at block 620. The method 600*a* can also include normalizing the at least one specific audio signal for each speaker to compensate for a speaker density of the set of speakers at block 622.

In some embodiments, a method 600*b* can include monitoring a location having a high relative speaker density for the volume of the audio object or a volume of a specific audio emission from a specific speaker in the set of speakers at block 630. The method 600*b* can include comparing the monitored volume to a maximum volume threshold at block 632. The maximum volume threshold can be determined by the system or manually set by an operator. Historical volume values may also be averaged for determining a medial for a maximum volume threshold and minimum volume threshold. When the monitored volume is higher than the maximum volume threshold, the method 600 can include normalizing the at least one specific audio signal to obtain the at least one normalized specific audio signal so that the volume is at or less than the volume threshold for the rendered audio object at the defined audio object location at block 634.

Figure 6B:
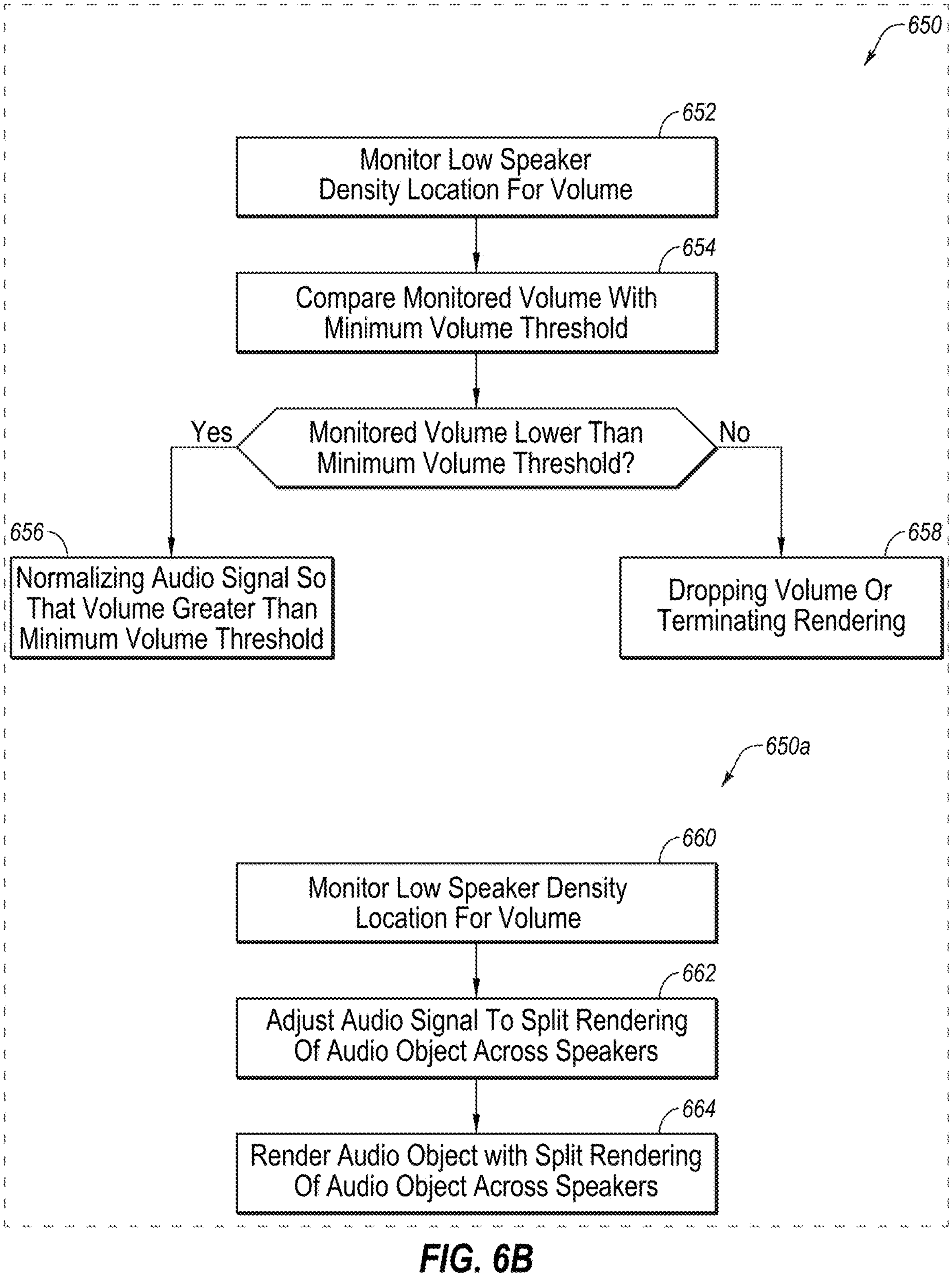
FIG. 6B is a flow diagram that illustrates aspects of a method of normalizing audio signals.

FIG. 6B shows an embodiment of a method 650 for normalizing an audio signal for rendering an audio object, which method 650 can be performed with an audio system, such as an embodiments of an audio system described herein. The method 650 can include monitoring a location having a low relative speaker density for the volume of the audio object or a volume of a specific audio emission from a specific speaker in the set of speakers at block 652. The method 650 can include comparing the monitored volume to a minimum volume threshold at block 654. When the monitored volume is lower than the minimum volume threshold, the method 650 can include normalizing the at least one specific audio signal to the at least one normalized specific audio signal so that the volume is at or greater than the minimum volume threshold for the rendered audio object at the defined audio object location at block 656. Alternatively, when the monitored volume is lower than the minimum volume threshold, the method 650 can include dropping the volume to no volume or terminating rendering of the audio object at block 568. When the monitored volume is higher than the minimum volume threshold, the audio may be played with or without normalization. By turning up the object so that it is at the minimum audio threshold, the protocol also changes the position in space. The more volume turn up of an object, the more its perceived position will change, which can be likened to a volume, position uncertainty principle.

The method 650*a* can include monitoring a speaker density of the set of speakers in the plurality of speakers for the volume of the audio object or a volume of a specific audio emission from a specific speaker in the set of speakers at block 660. The method 650*a* can include adjusting each specific audio signal so as to adjust monitored volume to split rendering of the audio object to the set of speakers to normalize each specific audio signal at block 662. The method 650*a* can include providing each normalized specific audio signal to a specific speaker in the set of speakers so that rendering of the audio object is evenly divided across the set of speakers block 664.

Figure 6C:
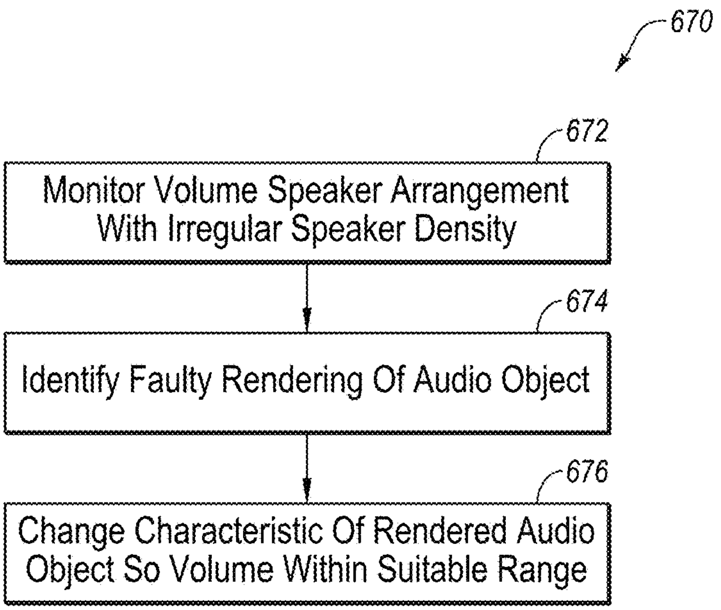
FIG. 6C is a flow diagram that illustrates aspects of a method of normalizing audio signals.

FIG. 6C can include method 670 for normalizing an audio signal for rendering an audio object, which method 670 can be performed with an audio system, such as an embodiments of an audio system described herein. The method 670 can include monitoring the volume of the audio object or a volume of a specific audio emission from a specific speaker in the set of speakers in the speaker arrangement that has an irregular speaker density at block 672. The method 670 can include identifying at least one audio object having a faulty rendering with the monitored volume above a maximum volume threshold or below a minimum volume threshold at block 674. The method 670 can include normalizing the at least one specific audio signal to change a characteristic of the rendered audio object so that the volume is between the maximum volume threshold and minimum volume threshold at block 676. In some aspects, the characteristic that is changed during normalization includes at least one of: minimum volume of rendered audio object; maximum volume of rendered audio object; defined location of the rendered audio object; defined height of the rendered audio object with respect to a base level; defined distance of the rendered audio object from at least one speaker; defined distance of the rendered audio object from at least one environment object in the environment; defined distance of the rendered audio object to a second rendered audio object; or combinations thereof.

Figure 6D:
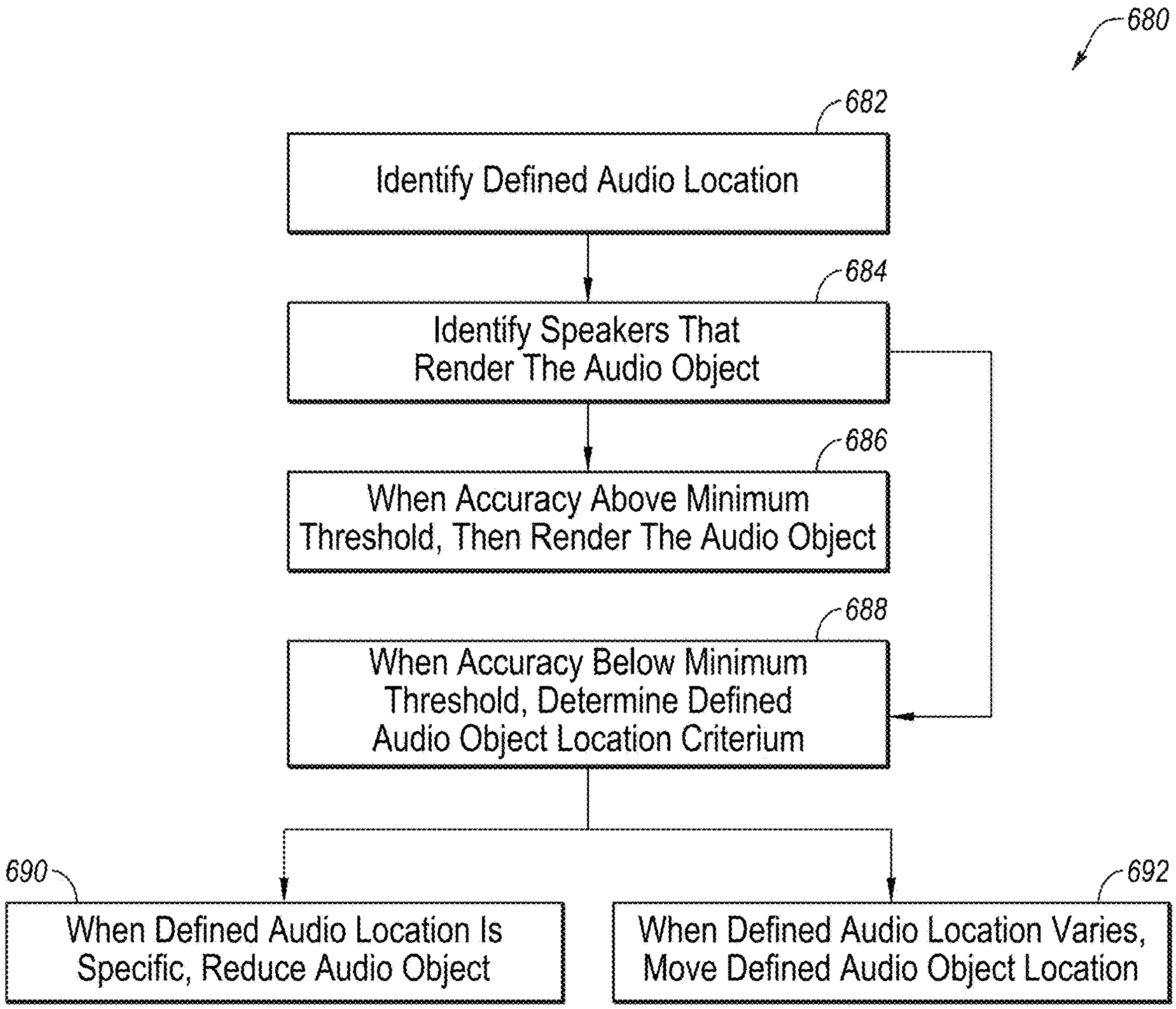
FIG. 6D is a flow diagram that illustrates aspects of a method of normalizing audio signals.

FIG. 6D can include method 680 for normalizing an audio signal for rendering an audio object, which method 680 can be performed with an audio system, such as an embodiments of an audio system described herein. The method 680 can include identify the defined audio object location in the environment at block 682. The method 680 can include identifying the set of speakers that render the audio object at the defined audio object location at block 684. The method 680 can include determining the accuracy of the rendering of the audio object in the defined audio object location at block 686, such as by comparing with an audio heatmap of the audio system. When the accuracy is above a minimum accuracy threshold, the method 680 can render the audio object at the defined audio object location at block 686. When the accuracy is below a minimum accuracy threshold, the method 680 can perform the following operations: determine at least one defined audio object location criterium for the audio object at block 688; when the at least one defined audio object location is specific, turn down (e.g., reduce) or terminate rendering of the audio object at block 690; or when the at least one defined audio object location varies, move the defined location of the audio object to a second location that satisfies the at least one defined audio object location criterium and provides the accuracy over the minimum accuracy threshold at block 692. In some instances, the rendering of the audio object will be merely reduced or the volume thereof will be decreased to make the audio object appear to be less loud. In some instances, the audio object can be terminated if the accuracy is 0. In most instances, the volume for the audio object can be tapered down to a certain level or tapered until off or substantially off. In some instances, this is dependent on how important it is to preserve the objects original position. A highly position dependent object can be turned down when there is insufficient accuracy, where objects that are considered vital to the scene will change position to preserve full volume.

In some embodiments, the at least one defined audio object location depends on object type. The object type includes at least one of: a ground audio object that is restricted to being rendered only on ground locations (e.g., a mouse, dog, cat, rolling ball, car, truck, or the like); an air audio object that is restricted to being rendered only in air locations above the ground (e.g., flying bird, plane, helicopter, or the like); or hybrid ground and air audio objects that are allowed to be rendered on ground locations and air locations (e.g., bird walking and flying, blowing leaves, rustling bushes or tree limbs, aircraft taking off, animal jumping, or the like).

In some embodiments, the normalizing performed in the method is a basic normalization protocol with an intensity of the rendered audio object at the defined audio object location that is proportional to the summation of squared volume of sound from each speaker in the set of speakers.

In some embodiments, the normalizing performed in the method is a dynamic normalization protocol based a normalization factor and in view of a level of importance of rendering the audio object and in view of an accuracy of rendering the audio object in the defined audio object location. In some aspects, an importance of 1 provides that the audio object is always rendered and an importance of 0 provides that the audio object is rendered when there is sufficient accuracy. In some aspects, an accuracy of 1 provides that the audio object is rendered accurately by the set of speakers and an accuracy and accuracy at values lower than 1 represents the maximum volume for the set of speaker to render the audio object.

Referring back to the figures, the audio system can include a plurality of speakers positioned in a speaker arrangement in an environment and an audio signal generator operably coupled with each speaker of the plurality of speakers. The audio signal generator is configured to provide a specific audio signal to each speaker of a set of speakers to cause a coordinated audio emission from each speaker in the set of speakers to render an audio object in a defined audio object location in the environment based on an audio heatmap. The audio signal generator is configured to process audio data that is obtained from a memory device for each specific audio signal, which processing takes into account the audio heatmap so that each speaker can be provided an appropriate specific audio signal for normalizing the audio object. The audio signal generator is configured to analyze the audio heatmap based on the audio data in view of the speaker arrangement in the environment to determine the specific audio signals for each speaker in the speaker set to render the audio object in the defined audio object location. The audio signal generator includes at least one processor configured to cause performance of operations, such as the following operations described herein. The operations can include causing the audio system to obtain speaker arrangement data defining the speaker arrangement in the environment, wherein the speaker arrangement data includes location and orientation data for each speaker. The system can obtain speaker acoustic properties of each speaker in the speaker arrangement and determine an audio emission profile for each speaker based on the speaker acoustic properties and orientation. The system can then determine the coordinated audio emission profile for at least the set of speakers, and optionally all of the speakers. Based on the foregoing, the audio system can generate and provide a report having the audio heatmap for the plurality of speakers in the speaker arrangement in the environment. In the report, the audio heatmap defines a coordinated audio emission profile for the plurality of speakers. This can include visually showing a map having the audio gradients to simulate a heatmap. The heatmap can include high characteristics visually different from low characteristics. The heatmap can include over-dense regions and over-sparse regions. The characteristic can be sound intensity, volume, oscillation, or other parameter. The audio system can be used to perform methods of normalizing an audio signal for rendering an audio object. The methods can use the heatmap for normalizing of the audio signals or the data, in order to provide the normalized audio signal so that the audio object can be properly rendered at a defined location without volume spikes or dropout.

Figure 7A:
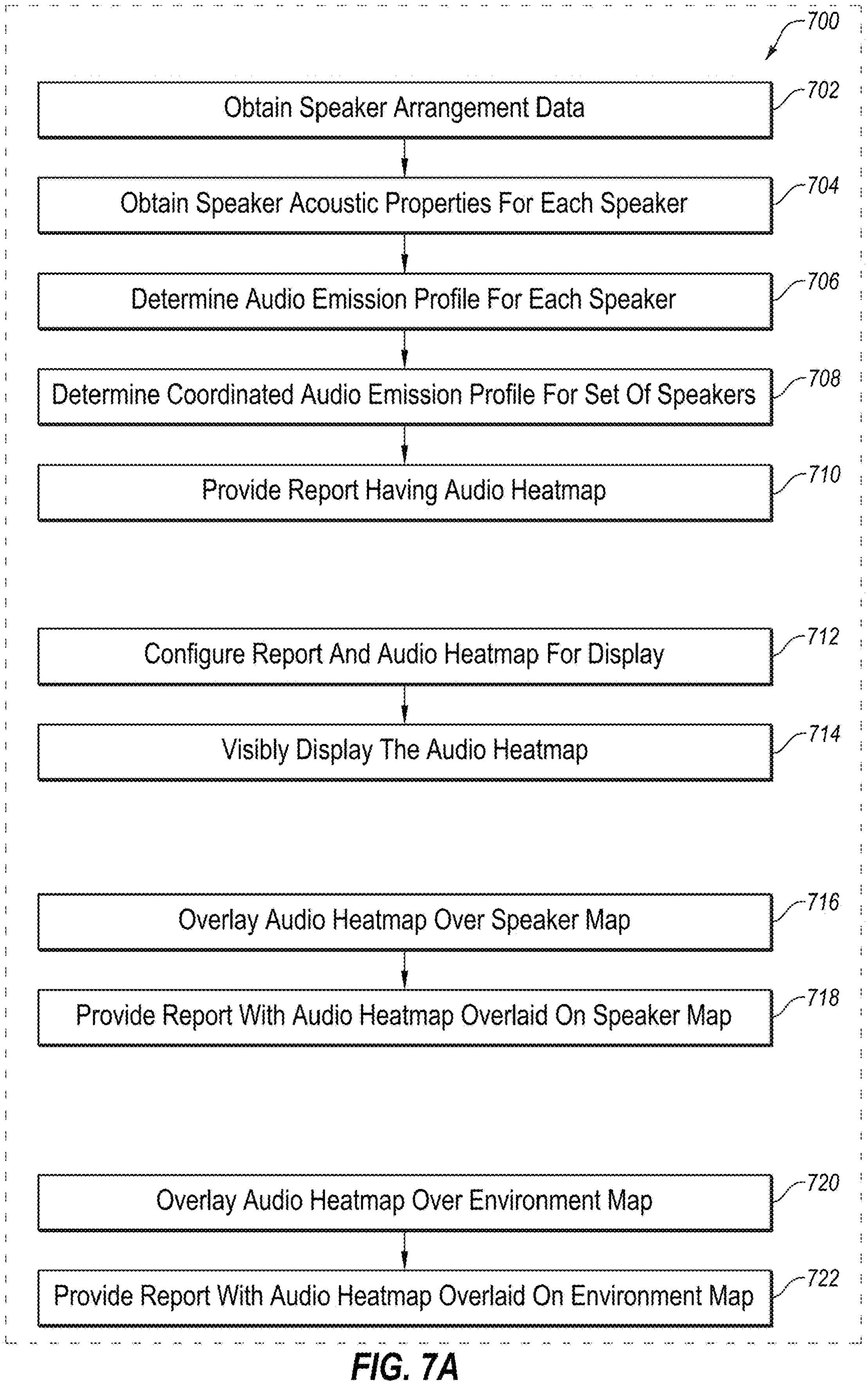
FIG. 7A is a flow diagram that illustrates a method of generating an audio heatmap for an arrangement of speakers.

FIG. 7A shows an embodiment of a method 700 for preparing a heatmap or modifying a heatmap, which can be used for normalizing an audio signal for rendering an audio object, which method 700 can be performed with an audio system, such as an embodiments of an audio system described herein. The method 700 of generating an audio heatmap for an audio system can include providing a plurality of speakers positioned in a speaker arrangement in an environment. The method 700 can also include providing an audio signal generator operably coupled with each speaker of the plurality of speakers. The audio signal generator is configured to provide a specific audio signal to each speaker of a set of speakers based on the audio heatmap in order to cause a coordinated audio emission from each speaker in the set of speakers to render an audio object in a defined audio object location in the environment. The audio signal generator is configured to process audio data that is obtained from a memory device for each specific audio signal. The method 700 can include obtaining speaker arrangement data defining the speaker arrangement in the environment at block 702, and obtaining speaker acoustic properties of each speaker in the speaker arrangement at block 704. The speaker arrangement data may be included in map that shows the location of each speaker in the environment, and subsequently the audio heatmap when generated can be laid over the map of the speakers. The speaker arrangement can include location and orientation data for each speaker, which can be used to determine the sound potential along with the acoustic properties for generating an audio object. The method 700 can include determining an audio emission profile for each speaker based on the speaker acoustic properties and orientation at block 706. The method 700 can include determining the coordinated audio emission profile for at least the set of speakers at block 708, such as the set of speakers that will render an audio object or different sets of speakers or all of the speakers. Each set of speakers can be analyzed to obtain the coordinated audio emission profile. Each audio emission profile of each speaker or an audio emission profile for a set of speakers can be used to obtain an audio emission profile for the entire plurality of speakers. The combined audio emission profile can be considered to be an audio heatmap. The method 700 can include providing a report having the audio heatmap for the plurality of speakers in the speaker arrangement in the environment at block 710, wherein the audio heatmap defines a coordinated audio emission profile for the plurality of speakers.

In some embodiments, the method 700 can include providing the report having the audio heatmap to a display operably coupled with the audio signal generator at block 712, wherein the display is configured to receive audio heatmap data and visually display the audio heatmap at block 714.

In some embodiments, the method 700 can include overlaying the audio heatmap over a speaker map of the plurality of speakers at block 716, and then providing the report with the audio heatmap overlaid over the speaker map at block 718.

In some embodiments, the method 700 can include overlaying the audio heatmap over a map of the environment and a map of the plurality of speakers at block 720, and providing the report with the audio heatmap overlaid over the map of the environment and the map of the plurality of speakers at block 722.

Figure 7B:
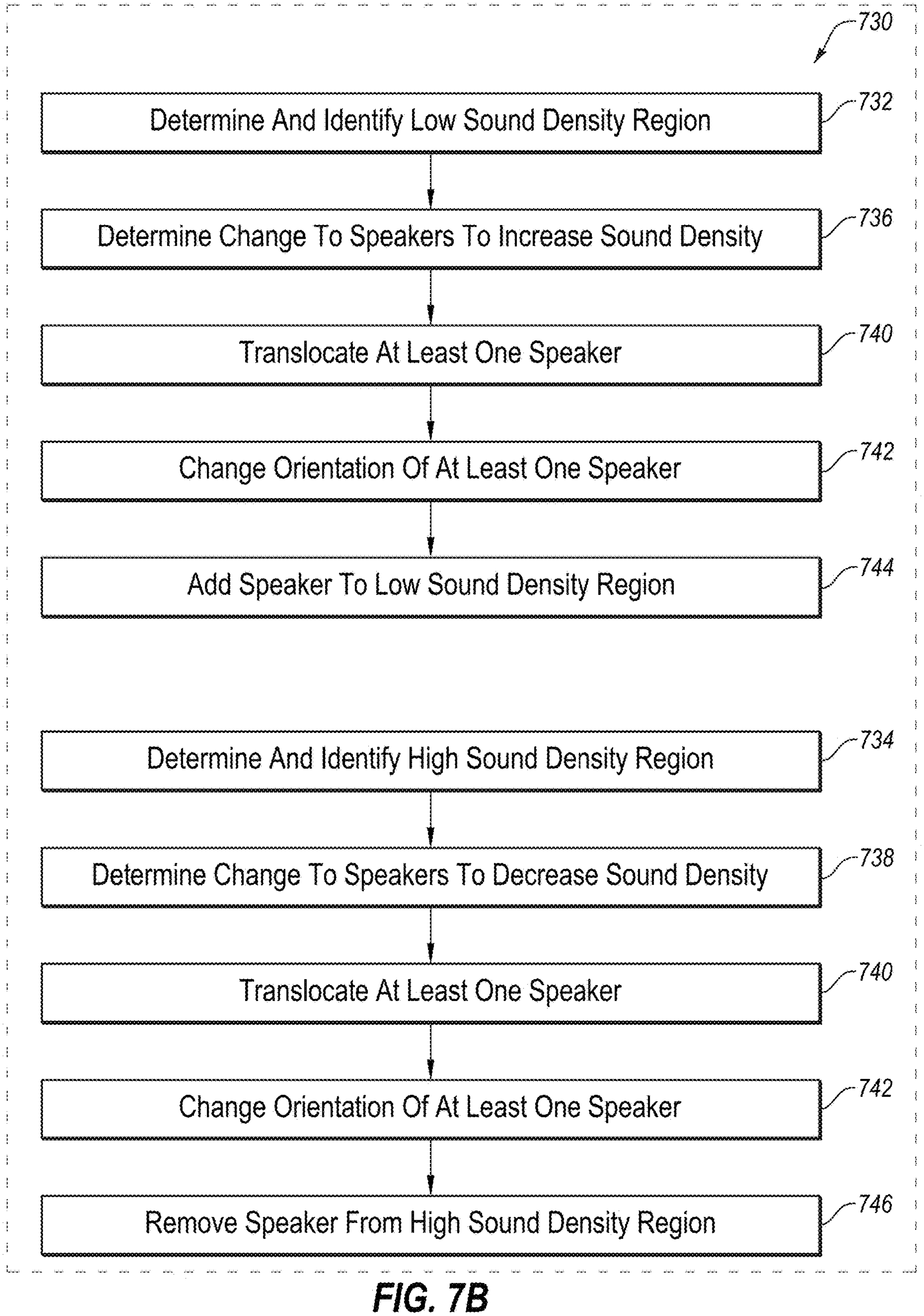
FIG. 7B is a flow diagram that illustrates aspects of a method of generating an audio heatmap.

FIG. 7B shows an embodiment of a method 730 for preparing a heatmap or modifying a heatmap, which can be used for normalizing an audio signal for rendering an audio object, which method 730 can be performed with an audio system, such as an embodiments of an audio system described herein. The method 730 can include determining and identifying at least one region of low sound density in a relative sound density gradient in the audio heatmap at block 732. Alternatively or in addition, the method 730 can include determining and identifying at least one region of high sound density in a relative sound density gradient in the audio heatmap at block 734.

In some embodiments, high speaker density regions or low speaker density regions can be identified by the system, such as in method 730. This allows the system to monitor the audio heatmap in view of the speaker arrangements, and then propose modifications to the speaker arrangement by modifying the speaker locations and/or the speaker orientations. As such, method 730 can include determining a change in the speaker arrangement of at least one speaker in order to increase sound density in at least one low sound density region at block 736. The method 730 may also include determining a change in the speaker arrangement of at least one speaker in order to decrease sound density in at least one high sound density region at block 744. This may also include decreasing variance of sound density of the heatmap. In some aspects, the change in speaker arrangement is attempting to lower the variance in the heatmap, or attempting to make the speaker density even throughout the space. The method 730 may also include identifying at least one of the following actions to increase sound density in at least one low sound density region or to decrease sound density in at least one high sound density region: translocating at least one speaker from a first location and orientation to a second location and orientation at block 740; changing orientation of at least one speaker from a first orientation to a second orientation in a same location at block 742; adding at least one additional speaker to the at least one low sound density region at block 744, wherein the added at least one additional speaker is defined to be added at a specific location in a specific orientation; or removing at least one speaker from the at least one high sound density region at block 746. Additionally, method 730 can also include providing a report with any of the determined or identified information. For example, the report can identify the sound density regions, and then identify how to change the sound density region for better rendering of the audio object. This can include providing a modified speaker map that shows where to place the speakers and where to orient the speakers for improved rendering. The report can be tailored to only move or orient speakers when no more speakers are available. Alternatively, the report can show where to add additional speakers without moving or removing any other speakers. The audio heatmap can be changed to show the distribution of audio based on a changed speaker locations. Various iterations of heatmaps can be provided based on different real speaker arrangements or a virtual speaker arrangement (e.g., prophetic audio heatmap).

Figure 7C:
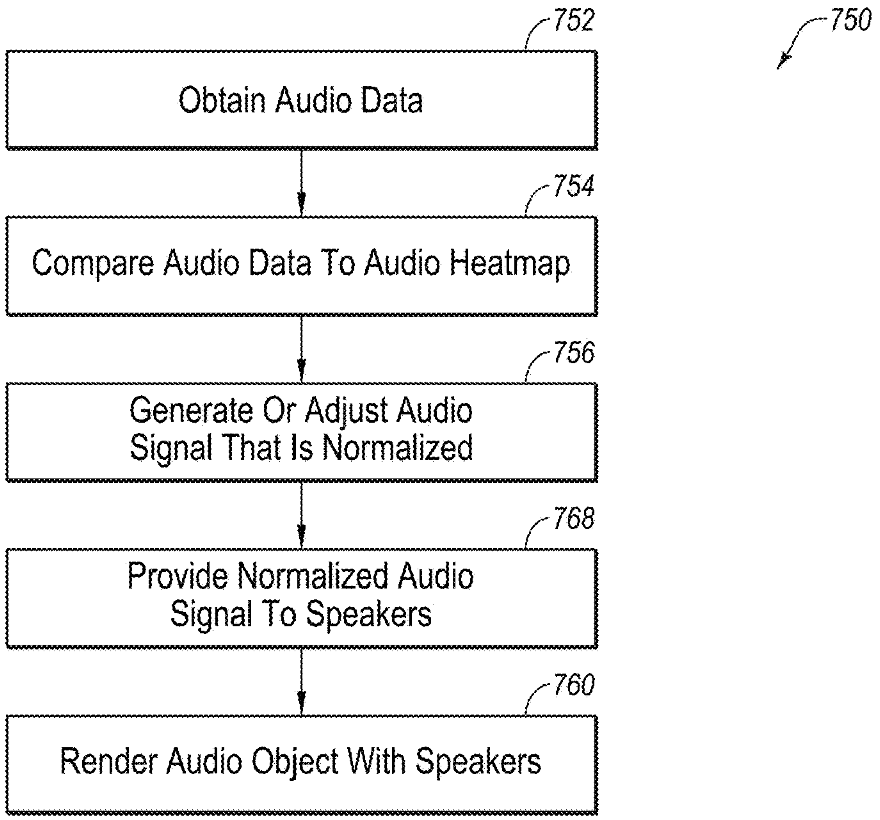
FIG. 7C is a flow diagram that illustrates aspects of a method of generating an audio heatmap

FIG. 7C shows an embodiment of a method 750 for preparing a heatmap or modifying a heatmap, which can be used for normalizing an audio signal for rendering an audio object, which method 750 can be performed with an audio system, such as an embodiments of an audio system described herein. The method 750 can include obtaining the audio data at block 752 and obtaining the audio heatmap. The method 750 can then include comparing the audio data to the audio heatmap at block 754. Based on the comparison, the method 750 can generate or adjust at least one specific audio signal to each speaker of the speaker set to render the audio object at the defined audio object location. providing the at least one normalized specific audio signal to each speaker of the speaker set at block 758. Then, the method 750 can include rendering the audio object by speaker set based on the at least one normalized specific audio signal at block 760.

Figure 7D:
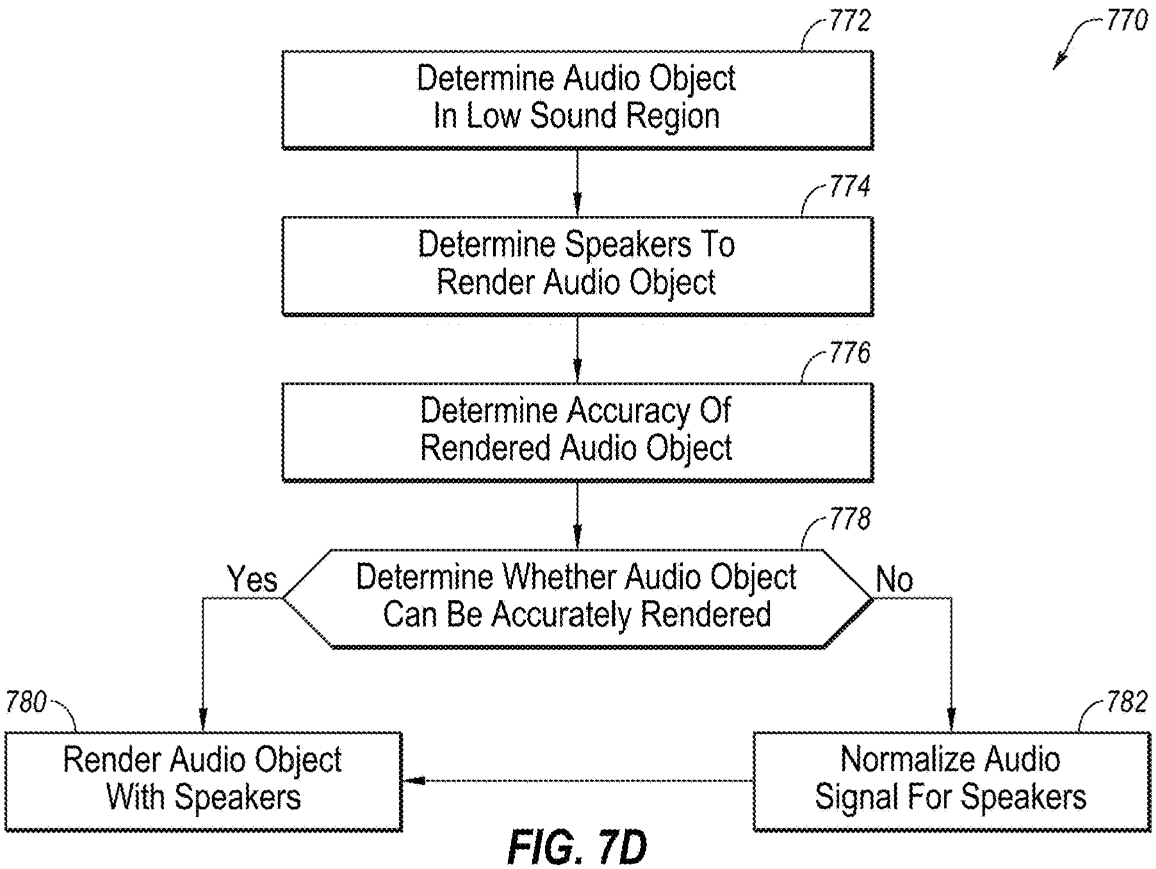
FIG. 7D is a flow diagram that illustrates aspects of a method of generating an audio heatmap

FIG. 7D shows an embodiment of a method 770 for preparing a heatmap or modifying a heatmap, which can be used for normalizing an audio signal for rendering an audio object, which method 770 can be performed with an audio system, such as an embodiments of an audio system described herein. The method 770 can be implemented when there is a defined audio object location that is in a region of low sound density, which can be determined at block 772. The method 770 can determine a first set of speakers to render the audio object at the defined audio object location at block 774. The method 770 can determine an accuracy of the rendered audio object by the first set of speakers at block 776. The accuracy can be determined based on the audio heatmap, or by the normalization protocol (e.g., dynamic normalization) as applied to the audio object in the audio system. Then, the method 770 can determine whether the audio object can be rendered (e.g., accurately rendered without volume spikes or dropout) at the defined audio object location by the first set of speakers at block 778. If the audio object can be rendered at the defined audio object location by the first set of speakers, the method 770 includes providing the at least one specific audio signal to each speaker of the speaker set to render the audio object consistently and smoothly without volume spikes or dropout at block 780. If the audio object cannot be rendered at the defined audio object location by the first set of speakers, the method 770 can modulate the at least one specific audio signal for each speaker of the speaker set (e.g., by normalization) at block 782 to render the audio object consistently and smoothly without volume spikes or dropout or cancel rendering of the audio object at the defined audio object location at block 780. Alternatively, the action can reduce rendering of the audio object at the defined audio object location, or inhibit rendering the audio object at an improper location. This can prevent improper positioning or preventing a change to a closest region of speaker accuracy.

In some embodiments, the methods described herein can include modulating the at least one specific audio signal by performing a normalization protocol that normalizes the at least one specific audio signal to at least one normalized audio signal for each speaker of the speaker set. The normalized audio signal can cause the speaker set to render audio object consistently and smoothly without volume spikes or dropout.

Modifications, additions, or omissions may be made to any of the methods without departing from the scope of the present disclosure. For example, the functions and/or operations described may be implemented in differing order than presented or one or more operations may be performed at substantially the same time. Additionally, one or more operations may be performed with respect to each of multiple virtual computing environments at the same time. Furthermore, the outlined functions and operations are only provided as examples, and some of the functions and operations may be optional, combined into fewer functions and operations, or expanded into additional functions and operations without detracting from the essence of the disclosed embodiments.

Additionally, one or more operations may be performed with respect to each of multiple virtual computing environments at the same time. Furthermore, the outlined functions and operations are only provided as examples, and some of the functions and operations may be optional, combined into fewer functions and operations, or expanded into additional functions and operations without detracting from the essence of the disclosed embodiments.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms “module” or “component” may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a “computing entity” may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it may be understood that the various changes, substitutions, and alterations may be made hereto without departing from the spirit and scope of the present disclosure.

What is claimed is:

1. An audio system comprising:

a plurality of speakers positioned in a speaker arrangement in an environment; and an audio signal generator operably coupled with each speaker of the plurality of speakers, wherein the audio signal generator includes at least one processor configured to cause performance of operations, the operations including:

obtaining an audio heatmap that represents a coordinated sound emission profile in the environment with the plurality of speakers, the coordinated sound emission profile being based on an audio emission profile of each speaker in the plurality of speakers, each respective audio emission profile being based on a volume potential of a speaker in the plurality of speakers, a position of the speaker in the environment, sensor information of the audio signal generator, and acoustic properties of the environment, wherein each point in the audio heatmap represents an ability to locate an audio object at a corresponding point location in the environment and the audio heatmap is generated from speaker arrangement data including location and orientation data for each speaker;

comparing one or more rendering locations of the audio object with the audio heatmap;

determining the one or more rendering locations to result in a deficient rendering of the audio object based on the audio heatmap; and causing the plurality of speakers to reduce a volume of the audio object to be inaudible in the one or more rendering locations or causing the plurality of speakers to not render the audio object in the one or more rendering locations.

2. The audio system of claim 1, wherein the determining the one or more rendering locations to result in the deficient rendering of the audio object includes determining the one or more rendering locations in the audio heatmap to result in an audio unevenness or rapid volume dropout for the audio object, wherein causing the plurality of speakers to reduce the volume for the audio object to be inaudible in the one or more rendering locations includes modulating audio output of one or more speakers of the plurality of speakers.

3. The audio system of claim 1, wherein the operations further include at least one of:

determining the speaker arrangement to have inadequate speaker density or positioning to render the audio object in the one or more rendering locations, determining an ambiance of the environment to be improved without the audio object being rendered in the one or more rendering locations, or determining that rendering of the audio object in the one or more rendering locations results in rendering of the audio object in a different rendering location due to the speaker arrangement.

4. The audio system of claim 1, wherein the one or more rendering locations of the audio object are included in a travel path of the audio object in the environment and the operations further include:

comparing the travel path of the audio object in the environment with the audio heatmap, wherein comparing the travel path of the audio object includes comparing the one or more rendering locations;

determining the travel path includes a path portion that passes through a region in the environment that the audio heatmap indicates is deficient for rendering of the audio object, the path portion including the one or more rendering locations; and causing the plurality of speakers to reduce the volume for the audio object to be inaudible in the path portion of the travel path or causing the plurality of speakers to not render the audio object in the path portion of the travel path.

5. The audio system of claim 4, wherein the operations further include causing the rendering of the audio object to audibly taper as the rendering of the audio object in the travel path approaches the path portion of the travel path.

6. The audio system of claim 1, wherein the reducing the volume for the audio object to be inaudible in the one or more rendering locations includes rendering of the audio object to audibly taper.

7. The audio system of claim 4, wherein the operations further include:

determining the travel path includes a second portion of the travel path that passes through a second region in the environment that the audio heatmap indicates is sufficient for rendering the audio object; and modulating audio output of one or more speakers of the plurality of speakers so that the audio object is rendered along the travel path in the second region.

8. The audio system of claim 7, wherein the operations further include causing the rendering of the audio object to audibly gradually increase as the travel path leaves the second portion of the travel path and enters into the second region.

9. The audio system of claim 1, wherein the determining the one or more rendering locations to result in a deficient rendering of the audio object includes determining rendering of the audio object at the one or more rendering locations to have a volume lower than a minimum volume threshold.

10. The audio system of claim 1, wherein the operations further include determining, based on the audio heatmap, a second rendering location of the audio object with a sufficient rendering of the audio object.

11. A method for inhibiting an audio object from rendering, the method comprising:

obtaining an audio heatmap that represents a coordinated sound emission profile in an environment from a plurality of speakers in a speaker arrangement, the coordinated sound emission profile being based on an audio emission profile of each speaker in the plurality of speakers, each respective audio emission profile being based on a volume potential of a speaker in the plurality of speakers, a position of the speaker in the environment, sensor information of an audio signal generator, and acoustic properties of the environment, wherein each point in the audio heatmap represents an ability to locate the audio object at a corresponding point location in the environment and the audio heatmap is generated from speaker arrangement data including location and orientation data for each speaker;

comparing one or more rendering locations of the audio object with the audio heatmap;

determining the one or more rendering locations to result in a deficient rendering of the audio object based on the audio heatmap; and causing the plurality of speakers to reduce a volume of the audio object to be inaudible in the one or more rendering locations or causing the plurality of speakers to not render the audio object in the one or more rendering locations.

12. The method of claim 11, wherein the determining the one or more rendering locations to result in the deficient rendering includes determining the one or more rendering locations in the audio heatmap to result in an audio unevenness or rapid volume dropout for the audio object, wherein causing the plurality of speakers to reduce the volume of the audio object to be inaudible in the one or more rendering locations includes modulating audio output of one or more speakers of the plurality of speakers.

13. The method of claim 11, further comprising at least one of:

determining the speaker arrangement to have inadequate speaker density or positioning to render the audio object in the one or more rendering locations, determining an ambiance of the environment to be improved without the audio object being rendered in the one or more rendering locations, or determining rendering of the audio object in the one or more rendering locations results in rendering of the audio object in a different rendering location due to the speaker arrangement.

14. The method of claim 11, wherein the one or more rendering locations of the audio object are included in a travel path of the audio object in the environment and the method further comprises:

comparing the travel path of the audio object in the environment with the audio heatmap, wherein comparing the travel path of the audio object includes comparing the one or more rendering locations;

determining the travel path includes a path portion that passes through a region in the environment that the audio heatmap indicates to be deficient for rendering of the audio object, the path portion including the one or more rendering locations; and causing the plurality of speakers to reduce the volume for the audio object to be inaudible in the path portion of the travel path or causing the plurality of speakers to not render the audio object in the path portion of the travel path.

15. The method of claim 14, further comprising causing the rendering of the audio object to audibly taper as the rendering of the audio object in the travel path approaches the path portion of the travel path.

16. The method of claim 11, wherein the reducing the volume for the audio object to be inaudible in the one or more rendering locations includes rendering of the audio object to audibly taper.

17. The method of claim 14, further comprising:

determining the travel path includes a second portion of the travel path that passes through a second region in the environment that is sufficient for rendering the audio object; and modulating audio output of one or more speakers of the plurality of speakers so that the audio object is rendered along the travel path in the second region.

18. The method of claim 17, further comprising causing the rendering of the audio object to audibly gradually increase as the travel path leaves the second portion of the travel path and enters into the second region.

19. The method of claim 11, wherein the determining the one or more rendering locations to result in a deficient rendering of the audio object includes determining the rendering of the audio object at the one or more rendering locations to have a volume lower than a minimum volume threshold.

20. The method of claim 11, further comprising:

determining, based on the audio heatmap, a second rendering location of the audio object with a sufficient rendering of the audio object.

21. One or more non-transitory computer readable media storing instructions that in response to being executed by one or more processors, cause a computer system to perform operations, the operations comprising:

obtaining an audio heatmap that represents a coordinated sound emission profile in an environment from a plurality of speakers in a speaker arrangement, the coordinated sound emission profile being based on an audio emission profile of each speaker in the plurality of speakers, each respective audio emission profile being based on a volume potential of a speaker in the plurality of speakers, a position of the speaker in the environment, sensor information of an audio signal generator, and acoustic properties of the environment, wherein each point in the audio heatmap represents an ability to locate an audio object at a corresponding point location in the environment and the audio heatmap is generated from speaker arrangement data including location and orientation data for each speaker;

comparing one or more rendering locations of the audio object with the audio heatmap;

determining the one or more rendering locations to result in a deficient rendering of the audio object based on the audio heatmap; and causing the plurality of speakers to reduce a volume of the audio object to be inaudible in the one or more rendering locations or causing the plurality of speakers to not render the audio object in the one or more rendering locations.

* * * * *